(12) United States Patent
Daiku

(10) Patent No.: US 7,518,593 B2
(45) Date of Patent: Apr. 14, 2009

(54) ILLUMINATOR FOR EMITTING AT LEAST TWO LIGHTS HAVING DIRECTIVITY AND DISPLAY APPARATUS USING SAME

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 187 days.

(21) Appl. No.: 11/391,915

(22) Filed: Mar. 29, 2006

(65) Prior Publication Data

US 2006/0221642 A1   Oct. 5, 2006

(30) Foreign Application Priority Data

Mar. 31, 2005   (JP)   ............................. 2005-101973

(51) Int. Cl.
G09G 3/36   (2006.01)
(52) U.S. Cl. ................. 345/102; 345/211; 345/213; 362/600; 362/611; 362/612; 349/61; 349/65
(58) Field of Classification Search ......... 345/211–213, 345/102
See application file for complete search history.

(56) References Cited

U.S. PATENT DOCUMENTS

| | | | | |
|---|---|---|---|---|
| 7,121,709 | B2 * | 10/2006 | Shinohara et al. | 362/606 |
| 7,201,510 | B2 * | 4/2007 | Yamashita et al. | 362/617 |
| 2006/0181897 | A1 * | 8/2006 | Ueno et al. | 362/600 |

FOREIGN PATENT DOCUMENTS

| | | |
|---|---|---|
| JP | 3-119889 B2 | 5/1991 |
| JP | 06-175600 A | 6/1994 |
| JP | 7-005455 B2 | 1/1995 |
| JP | 10-268230 B2 | 10/1998 |
| JP | 2004-111383 * | 4/2004 |
| JP | 2004-111383 A | 4/2004 |
| WO | WO 2004/025174 A1 | 3/2004 |
| WO | WO 2004/111531 A1 | 12/2004 |

\* cited by examiner

*Primary Examiner*—My-Chau T Tran
*Assistant Examiner*—Jennifer T Nguyen
(74) *Attorney, Agent, or Firm*—Frishauf, Holtz, Goodman & Chick, P.C.

(57) ABSTRACT

A display apparatus includes a liquid crystal display panel and an illuminator disposed at the back of the panel for emitting at least two illumination lights having directivities in different directions toward the panel. The illuminator includes a light guide plate made of transparent material whose one end surface serves as a light entrance end surface, whose one plate surface serves as a light exit surface, and whose other plate surface serves as a light direction changing surface for changing the advancing direction of light entering from the light entrance end surface. The light direction changing surface has a plurality of circular-arcing slanted surfaces shaped into semicircles formed on concentric circles centered at the center of the longer dimension of the light entrance end surface. Light emitting elements are disposed on the light entrance end surface at two positions on left and right sides of the center equidistantly apart therefrom.

13 Claims, 13 Drawing Sheets

ILLUMINATOR FOR EMITTING AT LEAST TWO LIGHTS HAVING DIRECTIVITY AND DISPLAY APPARATUS USING SAME

BACKGROUND OF THE INVENTION

1. Field of the Invention

The present invention relates to an illuminator for emitting lights having directivity in at least tow directions, and a display apparatus whose display panel is backed by this illuminator.

2. Description of the Related Art

Conventionally, edge-light type backlights have been known as illuminators for display panels. This type of backlight is built up of a light guide made of a transparent plate and a light source, wherein one end surface of the light guide serves as a light entrance surface for a light from the light source to enter, and one plate surface of the light guide serves as a light exit surface from which the light absorbed from the one end surface goes out, and wherein the light source is disposed so as to face the one end surface of the light guide. Light from the light source is let into the light guide from the light entrance surface and guided inside the light guide while being repetitively reflected on the light guide, so as to be let out from almost the entire surface of the light exit surface.

On the other hand, as a display apparatus using a display panel, there is proposed an apparatus which displays two different images on one display panel, one of which images is viewable when the display panel is viewed from the right hand side of the display panel, and the other one of which images is viewable when the display panel is viewed from the left hand side thereof.

Such a display apparatus is used for, for example, a car navigation system for displaying a navigation image when the display is seen from the driver's seat, while displaying a different video when the display is seen from the front passenger's seat. Such a display apparatus is also used for displaying two images having a parallax corresponding to the left and right eyes of the viewer on one display, so as to let a right eye image, which is to be viewed from the right hand side of the display apparatus, be recognized by the right eye of the viewer, and a left eye image to be viewed from the left hand side of the apparatus be recognized by the left eye of the viewer, thereby displaying a three-dimensional image.

Liquid crystal display apparatuses for displaying such three-dimensional images include an apparatus for displaying the left eye image by pixels on every other row while displaying the right eye image by pixels on remaining every other row, and distributing the light from pixels on every other row and the light from pixels on remaining every other row toward the left and right eyes of the viewer respectively by using a lenticular lens so that the left eye image and right eye image reach the intended eyes (Unexamined Japanese Patent Application KOKAI Publication No. H3-119889), or an apparatus for making the images be viewed by the left eye and right eye of the viewer via a parallax barrier in which a plurality of stripe-shaped transmissive portions and light opaque portions, which are parallel with the rows of pixels of the liquid crystal display panel, are disposed alternately (Unexamined Japanese Patent Application KOKAI Publication No. H7-005455 and Unexamined Japanese Patent Application KOKAI Publication No. H10-268230).

However, since such a display apparatus for displaying two images on one display panel displays one image by pixels on every other row of the display panel and displays the other image by pixels on remaining every other row, each image has a low resolution, therefore images having a satisfactory image quality cannot be displayed.

Furthermore, a lenticular lens having a lens pitch corresponding to the pixel pitch of the display panel, or a parallax barrier having a transparency pitch corresponding to the pixel pitch needs to be disposed such that each lens unit or each transparent portion will be in a predetermined positional relation with respect to the pixels on each row of the display panel with sufficient precision, making the display apparatus hard to manufacture.

SUMMARY OF THE INVENTION

An object of the present invention is to provide an illuminator suitable for a display apparatus which displays at least two images on one display panel for making these images be perceived separately from the right hand side and left hand side of the display panel.

Another object of the present invention is to provide a display apparatus which displays at least two images on one display panel for making these images be perceived separately from the right hand side and left hand side of the display panel.

Yet another object of the present invention is to provide a display apparatus which can display a three-dimensional image having a high resolution thus high in image quality, and which can be manufactured easily.

To achieve the above objects, an illuminator according to a first aspect of the present invention comprises:

a light guide plate having:
 a light entrance end surface, provided on one end surface of a plate-like transparent material, from which a light from a light source enters;
 a light exit surface, provided on a plate surface intersecting with the light entrance end surface, from which a light entering from the light entrance end surface goes out as guided in a predetermined direction;
 an opposite surface, provided on the other plate surface opposite to the light exit surface; and
 a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, and first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to be apart from the center by a substantially same distance, for entering illumination lights into the light guide plate from the light entrance end surface.

According to the illuminator according to the first aspect, lights emitted from the two light emitting elements can have their advancing directions changed to be emitted as a light having a light intensity peak in the left hand side with respect to the normal line of the illuminator and as a light having a light intensity peak in the right hand side with respect to the normal line. Thus, two illumination lights having strong directivities in directions in the left hand side and right hand side as seen from the observation side can be obtained from one illuminator.

In the present illuminator, it is preferred that the circular-arcing slanted surfaces be constituted by a plurality of circular-arcing reflection surfaces formed on the opposite surface of the light guide plate, to have shapes of semicircular arcs formed plurally on concentric circles centered at the center of a longer dimension of the light entrance end surface, for reflecting a first light emitted from the first light emitting element disposed on the light entrance end surface to travel inside the light guide plate, so that the first light will be emitted from the light exit surface with its advancing direction changed to a first direction inclined at a predetermined angle with respect to the vertical reference plane toward one side of the vertical reference plane on the horizontal reference plane, and for reflecting a second light emitted from the second light emitting element disposed on the light entrance end surface to travel inside the light guide plate, so that the second light will be emitted from the light exit surface with its advancing direction changed to a second direction inclined at a predetermined angle with respect to the vertical reference plane toward the other side of the vertical reference plane on the horizontal reference plane.

Alternatively, it is preferred that the circular-arcing slanted surfaces be constituted by a plurality of circular-arcing refraction surfaces formed on the light exit surface of the light guide plate, to have shapes of semicircular arcs formed plurally on concentric circles centered at the center of the longer dimension of the light entrance end surface, for refracting a first light emitted from the first light emitting element disposed on the light entrance end surface to travel inside the light guide plate, so that the first light will be emitted from the light exit surface with its advancing direction changed to a first direction inclined at a predetermined angle with respect to the vertical reference plane toward one side of the vertical reference plane and parallel with a plane perpendicular to the horizontal reference plane, and for refracting a second light emitted from the second light emitting element disposed on the light entrance end surface to travel inside the light guide plate, so that the second light will be emitted from the light exit surface with its advancing direction changed to a second direction inclined at a predetermined angle with respect to the vertical reference plane toward the other side of the vertical reference plane and parallel with a plane perpendicular to the horizontal reference plane. In this case, it is preferred that the illuminator further comprise a prism sheet disposed outside the light exit surface of the light guide plate, for refracting a light emitted from the light guide plate in a direction parallel with the horizontal reference plane, and it is further preferred that the prism sheet comprise a plurality of circular-arcing prisms formed to have shapes of semicircular arcs formed plurally on concentric circles centered at a point corresponding to the center of curvature of the circular-arcing slanted surfaces of the light guide plate.

In the present embodiment, it is preferred that the illuminator comprise a reflection plate disposed outside the opposite surface of the light guide plate, for reflecting a light emitted from the opposite surface toward the light guide plate.

It is preferred that the illuminator further comprise: a third light emitting element, disposed correspondingly to the center of the light entrance end surface of the light guide plate at which the center of curvature of arcs of the circular-arcing slanted surfaces is defined, for entering an illumination light into the light guide plate from the center of the light entrance end surface; and a light source drive circuit for controlling lighting of the first and second light emitting elements and the third light emitting element, and the light guide plate have a plurality of circular-arcing slanted surfaces for emitting a light entering from the center of the light entrance end surface from the light exit surface, by changing an advancing direction of the light to a direction parallel with the vertical reference plane. According to the present illuminator, two illumination lights having strong directivities in directions in the left hand side and right hand side as seen from the observation side, and an illumination light having a high luminance in the front-forward direction can be selectively emitted from one illuminator.

Further, it is preferred that the illuminator further comprise: fourth and fifth light emitting elements, disposed on the light entrance end surface of the light guide plate, on external sides of the first and second light emitting elements respectively, so as to face each other at positions at substantially an equal distance from the center at which the center of curvature of the arcs of the circular-arcing slanted surfaces is defined, for entering illumination lights into the light guide plate from the light entrance end surface; and a light source drive circuit for controlling lighting of the first and second light emitting elements and the fourth and fifth light emitting elements. In this case, two illumination lights having strong directivities in directions in the left hand side and right hand side as seen from the observation side and having a broad range of view can be obtained from one illuminator.

It is further preferred that the illuminator further comprise an anisotropic dispersion plate, disposed outside the light exit surface of the light guide plate so as to face the light exit surface, for dispersing a light emitted from the light exit surface, in directions inclined at predetermined angles within a predetermined range of angles, with respect to the vertical reference plane on the horizontal reference plane. Also in this case, two illumination lights having strong directivities in directions in the left hand side and right hand side as seen from the observation side and having a broad range of view can be obtained from one illuminator.

A display apparatus according to a second aspect of the present invention comprises (1) a display panel having a display area on which a plurality of pixels are arranged in a matrix, for displaying at least one image by the plurality of pixels when a display signal corresponding to image data for displaying an image is supplied to each of the plurality of pixels, (2) an illuminator disposed at a back of the display panel and comprising (i) a light guide plate having:

a light entrance end surface, provided on one end surface of a plate-like transparent material, from which a light from a light source enters;

a light exit surface, provided on a plate surface intersecting with the light entrance end surface, from which a light entering from the light entrance end surface goes out as guided in a predetermined direction;

an opposite surface, provided on the other plate surface opposite to the light exit surface; and a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, and (ii) first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to face each other at the positions apart from the center by a substantially same distance, for entering illumination lights into the light guide plate from the light entrance end surface, and (3) a control device comprising a display drive circuit for sequentially displaying two different images on the display panel, and a light source drive circuit for controlling lighting of the first and second light emitting elements in accordance with the images displayed on the display panel.

According to the display apparatus according to the second aspect, different images can be displayed toward the right hand side and left hand side of the front-forward direction of the display apparatus. When the present display apparatus is applied to a three-dimensional display apparatus, it is possible to display a bright three-dimensional image by using illumination lights to be emitted toward the left and right hand sides as a left eye illumination light and a right eye illumination light to be recognized by the left and right eyes respectively. Further, by adjusting the positions of the two light sources disposed on the light entrance end surface of the light guide plate to enlarge the angles of the lights emitted toward the left and right hand sides, it is possible to make the image viewable from the right hand side and the image viewable from the left hand side different from each other, and thereby to display completely different images toward the right hand side and the left hand side.

In the present display apparatus, it is preferred that the circular-arcing slanted surfaces be constituted by a plurality of circular-arcing reflection surfaces formed on the opposite surface of the light guide plate, to have shapes of semicircular arcs formed plurally on concentric circles centered at the center of the longer dimension of the light entrance end surface, for reflecting a first light emitted from the first light emitting element disposed on the light entrance end surface to travel inside the light guide plate, so that the first light will be emitted from the light exit surface with its advancing direction changed to a first direction inclined at a predetermined angle with respect to the vertical reference plane toward one side of the vertical reference plane on the horizontal reference plane, and for reflecting a second light emitted from the second light emitting element disposed on the light entrance end surface to travel inside the light guide plate, so that the second light will be emitted from the light exit surface with its advancing direction changed to a second direction inclined at a predetermined angle with respect to the vertical reference plane toward the other side of the vertical reference plane on the horizontal reference plane.

Alternatively, it is preferred that the display apparatus further comprise a prism sheet disposed outside the light exit surface of the light guide plate, and having a plurality of circular-arcing prisms formed to have shapes of semicircular arcs formed plurally on concentric circles centered at a point corresponding to the center of curvature of the circular-arcing slanted surfaces of the light guide plate, for refracting a light emitted from the light guide plate in a direction parallel with the horizontal reference plane, and the circular-arcing slanted surfaces be constituted by a plurality of circular-arcing refraction surfaces formed on the light exit surface of the light guide plate, to have shapes of semicircular arcs formed plurally on concentric circles centered at the center of the longer dimension of the light entrance end surface, for refracting, together with the prism sheet, a first light emitted from the first light emitting element disposed on the light entrance end surface to travel inside the light guide plate, so that the first light will be emitted from the light exit surface with its advancing direction changed to a first direction inclined at a predetermined angle with respect to the vertical reference plane toward one side of the vertical reference plane and parallel with a plane perpendicular to the horizontal reference plane, and for refracting, together with the prism sheet, a second light emitted from the second light emitting element disposed on the light entrance end surface to travel inside the light guide plate, so that the second light will be emitted from the light exit surface with its advancing direction changed to a second direction inclined at a predetermined angle with respect to the vertical reference plane toward the other side of the vertical reference plane and parallel with a plane perpendicular to the horizontal reference plane.

It is further preferred that the display apparatus further comprise a third light emitting element, disposed correspondingly to the center of the light entrance end surface of the light guide plate at which the center of curvature of arcs of the circular-arcing slanted surfaces is defined, for entering an illumination light into the light guide plate from the center of the light entrance end surface, the light source drive circuit comprise a lighting control circuit for selecting alternate lighting of the first and second light emitting elements, and simultaneous lighting of the first, second, and third light emitting elements, and the light guide plate have a plurality of circular-arcing slanted surfaces for emitting a light entering from the center of the light entrance end surface from the light exit surface, by changing an advancing direction of the light to a direction parallel with the vertical reference plane. According to this structure, bright display can be achieved in the front-forward direction of the display apparatus.

It is further preferred that the display apparatus further comprise an anisotropic dispersion plate, disposed outside the light exit surface of the light guide plate so as to face the light exit surface, for dispersing a light emitted from the light exit surface, in directions inclined at predetermined angles within a predetermined range of angles, with respect to the vertical reference plane on the horizontal reference plane, or comprise fourth and fifth light emitting elements, disposed on the light entrance end surface of the light guide plate, on external sides of the first and second light emitting elements respectively, so as to face each other at positions at substantially an equal distance from the center at which the center of curvature of the arcs of the circular-arcing slanted surfaces is defined, for entering illumination lights into the light guide plate from the light entrance end surface, and the light source drive circuit comprise a lighting control circuit for alternately performing simultaneous lighting of the first and fourth light emitting elements disposed on one side of the center, and simultaneous lighting of the second and fifth light emitting elements disposed on the other side of the center. According to this structure, the range of angles of view is broadened in the range of directions inclined from the display apparatus.

A display apparatus according to a third aspect of the present invention comprises (1) a display panel having a display area on which a plurality of pixels are arranged in a matrix, for displaying at least one image by the plurality of pixels when a display signal corresponding to image data for displaying an image is supplied to each of the plurality of pixels, (2) an illuminator comprising (i) a light guide plate having:

a light entrance end surface, provided on one end surface of a plate-like transparent material, from which a light from a light source enters;

a light exit surface, provided on a plate surface intersecting with the light entrance end surface, from which a light entering from the light entrance end surface goes out as guided in a predetermined direction;

an opposite surface, provided on the other plate surface opposite to the light exit surface; and a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, and (ii) first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to face each other at the positions apart from the center by a substantially same distance, for entering illumination lights into the light guide plate from the light entrance end surface, (3) a display drive circuit for alternately displaying two images having a parallax corresponding to images recognized by left and right eyes of a viewer, on the display panel, and (4) a light source drive circuit for alternately lighting the first and second light emitting elements in accordance with display of the two images, wherein the illuminator is disposed at a back of the display panel, such that the vertical reference plane is disposed in line with an up and down orientation of the display panel.

According to the display apparatus according to the third aspect, three-dimensional display is achieved by an illuminator having a simple structure.

In this case, it is preferred that the circular-arcing slanted surfaces are constituted by a plurality of circular-arcing reflection surfaces formed on the opposite surface of the light guide plate, to have shapes of semicircular arcs formed plurally on concentric circles centered at the center of the longer dimension of the light entrance end surface, for reflecting a first light emitted from the first light emitting element disposed on the light entrance end surface to travel inside the light guide plate, so that the first light will be emitted toward the display panel as changed into a left eye illumination light having a directivity which will make an emission light intensity peak appear in a first direction inclined with respect to a normal line of the display panel toward one eye of the left and right eyes of the viewer, and for reflecting a second light emitted from the second light emitting element disposed on the light entrance end surface to travel inside the light guide plate, so that the second light will be emitted toward the display panel as changed into a right eye illumination light having a directivity which will make an emission light intensity peak appear in a second direction inclined toward the other eye.

Alternatively, it is preferred that the display apparatus further comprise a prism sheet disposed outside the light exit surface of the light guide plate, for refracting a light emitted from the light guide plate in a direction parallel with the horizontal reference plane, and the circular-arcing slanted surfaces be constituted by a plurality of circular-arcing refraction surfaces formed on the light exit surface of the light guide plate, to have shapes of semicircular arcs formed plurally on concentric circles centered at the center of the longer dimension of the light entrance end surface, for refracting, together with the prism sheet, a first light emitted from the first light emitting element disposed on the light entrance end surface of the light guide plate to travel inside the light guide plate, so that the first light will be emitted toward the display panel as changed into a left eye illumination light having a directivity which will make an emission light intensity peak appear in a first direction inclined with respect to a normal line of the display panel toward one eye of the left and right eyes of the viewer, and for refracting, together with the prism sheet, a second light emitted from the second light emitting element disposed on the light entrance end surface to travel inside the light guide plate, so that the second light will be emitted toward the display panel as changed into a right eye illumination light having a directivity which will make an emission light intensity peak appear in a second direction inclined toward the other eye.

It is further preferred that the display apparatus further comprise a third light emitting element, disposed correspondingly to the center of the light entrance end surface of the light guide plate at which the center of curvature of arcs of the circular-arcing slanted surfaces is defined, for entering an illumination light into the light guide plate from the center of the light entrance end surface, the light guide plate have a plurality of circular-arcing slanted surfaces for emitting a light entering from the center of the light entrance end surface from the light exit surface, by changing an advancing direction of the light so that the light will have an emission light intensity peak in a direction substantially parallel with a normal line of the light exit surface, and the light source drive circuit comprise a lighting control circuit for selecting alternate lighting of the first and second light emitting elements, and simultaneous lighting of the first, second, and third light emitting elements. According to this structure, a bright two-dimensional image can be displayed in the front-forward direction of the display apparatus.

It is further preferred that the display apparatus further comprise fourth and fifth light emitting elements, disposed on the light entrance end surface of the light guide plate, on external sides of the first and second light emitting elements respectively, so as to face each other at positions at substantially an equal distance from the center at which the enter of curvature of the arcs of the circular-arcing slanted surfaces is defined, for entering illumination lights into the light guide plate from the light entrance end surface, and the light source drive circuit comprise a lighting control circuit for alternately performing simultaneous lighting of the first and fourth light emitting elements disposed on one side of the center, and simultaneous lighting of the second and fifth light emitting elements disposed on the other side of the center. According to this structure, three-dimensional display is available in the front-forward direction of the display apparatus, and a two-dimensional image for the left or right eye image can be recognized from inclined directions in a broad range.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

First Embodiment

FIG. 1 to FIG. 7 show the first embodiment of the present invention. An example where an illuminator according to the present invention is applied to a display apparatus for performing three-dimensional display, will be explained.

Figure 1:
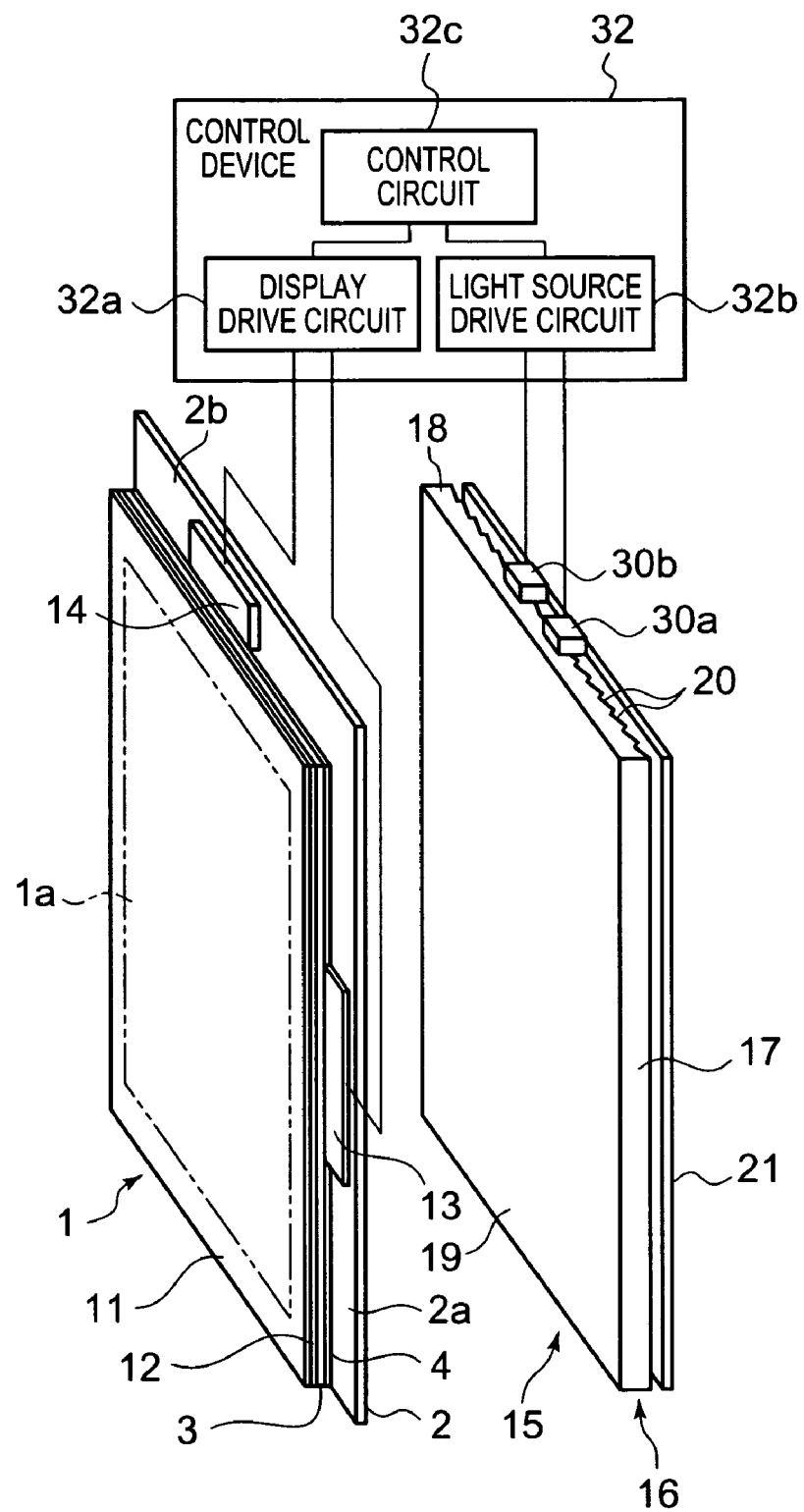
FIG. 1 is an exploded perspective view of a display apparatus showing the first embodiment of the present invention.

As shown in FIG. 1, the present display apparatus comprises a display area 1a on which a plurality of pixels (unillustrated) are arranged in a matrix, a liquid crystal display panel 1 on which at least one image is displayed by the plurality of pixels each supplied with a display signal corresponding to image data for displaying an image, an illuminator 15 disposed behind the back surface of the liquid crystal display panel 1 counter to the observation side, and a control device 32 for controlling the display by the liquid crystal display panel 1.

Figure 2:
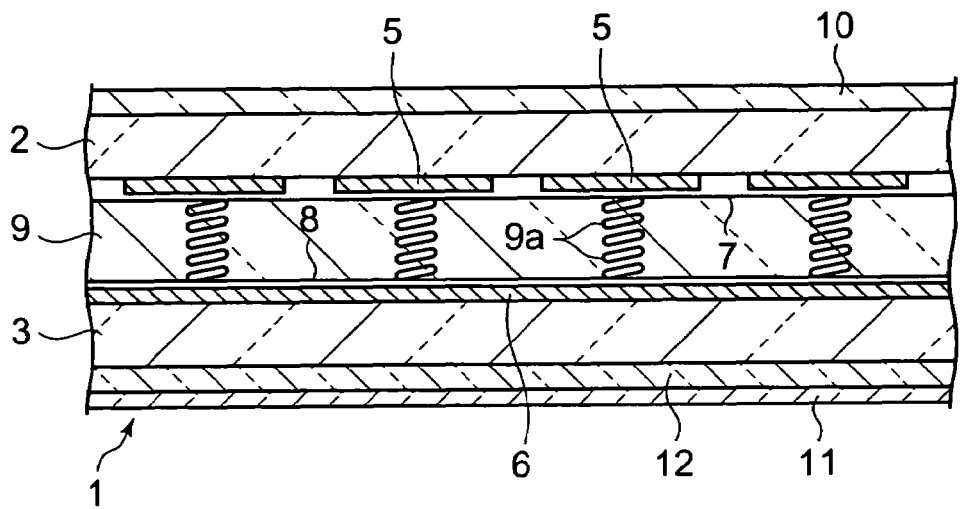
FIG. 2 is a cross-sectional view of a portion of a liquid crystal display panel used in the display apparatus shown in FIG. 1.

FIG. 2 is a cross-sectional view of one portion of the liquid crystal display panel 1. The liquid crystal display panel 1 comprises a pair of transparent substrates 2 and 3 jointed to each other via a frame-like sealing member 4 (see FIG. 1), transparent electrodes 5 and 6 formed on the opposite internal surfaces of the substrates 2 and 3 respectively, to define a plurality of pixels arranged in a matrix in the area where the electrodes 5 and 6 face each other, and a nematic liquid crystal layer 9 provided in the area enclosed by the sealing member 4 between the pair of substrates 2 and 3.

The liquid crystal display panel 1 used in the present embodiment is an active matrix liquid crystal display panel, in which a plurality of pixel electrodes 5 are formed on the internal surface of one of the pair of substrates 2 and 3, for example, on the internal surface of the substrate 2 counter to the observation side (the lower side in FIG. 2) in a matrix of row direction (left and right orientation in FIG. 2) and column direction (front and back orientation in FIG. 2), and a monolithic-frame-like opposite electrode 6 facing the plurality of pixel electrodes 5 is formed on the internal surface of the other substrate 3 on the observation side. The opposite substrate 2 is provided, on its internal surface, with a plurality of TFTs (Thin Film Transistors) connected to the plurality of pixel electrodes 5 respectively, a plurality of gate lines each supplying a gate signal to the TFTs on the corresponding row, and a plurality of data lines each supplying an image data signal to the TFTs on the corresponding column, although omitted from FIG. 2.

The present liquid crystal display panel 1 is a liquid crystal display panel of a bent orientation type having a quick responsibility, or of a homogeneous alignment type having no twist in the alignment of liquid crystal molecules and imparted with a quick responsibility by reducing the liquid crystal layer thickness (gap between the substrates). In case of a bent orientation liquid crystal display panel, the liquid crystal molecules 9*a* in the liquid crystal layer 9 are brought into spray alignment, with their pretilt angle controlled by homogeneous aligning films 7 and 8 formed so as to cover the electrodes 5 and 6 on the internal surfaces of the pair of substrates 2 and 3. In case of a homogeneous alignment liquid crystal display panel, the liquid crystal molecules 9*a* in the liquid crystal layer 9 are brought into homogeneous alignment, with their aligning direction defined by the homogeneous aligning films 7 and 8 such that the longer axis of the molecules is set in a uniform direction.

A pair of polarizing plates 10 and 11 are disposed on the external surfaces of the pair of substrates 2 and 3, with their transmission axis arranged in a predetermined direction. A retardation plate 12 for improving display contrast is disposed between one of the pair of substrates 2 and 3, for example, the substrate 3 on the observation side and the polarizing plate 11 on the observation side.

The substrate 2 opposite to the observation side of the liquid crystal display panel 1 is provided, as shown in FIG. 1, with driver mounting portions 2*a* and 2*b* which are drawn out to the outside of the observation side substrate 3, at one edge in the row direction and at one edge in the column direction. The aforementioned plurality of gate lines are connected to a gate driver 13 mounted on the driver mounting portion 2*a* in the row direction, and the plurality of data lines are connected to a data driver 14 mounted on the driver mounting portion 2*b* in the column direction. The opposite electrode 6 is connected to a supply source for supplying an opposite electrode potential, which source is included in one or both of the gate driver 13 and data driver 14, through unillstrated cross couplers provided at the portions where the substrates area jointed by the sealing member 4 and through an unillustrated opposite electrode connection line formed on one or both of the driver mounting portions 2*a* and 2*b*.

Figure 3:
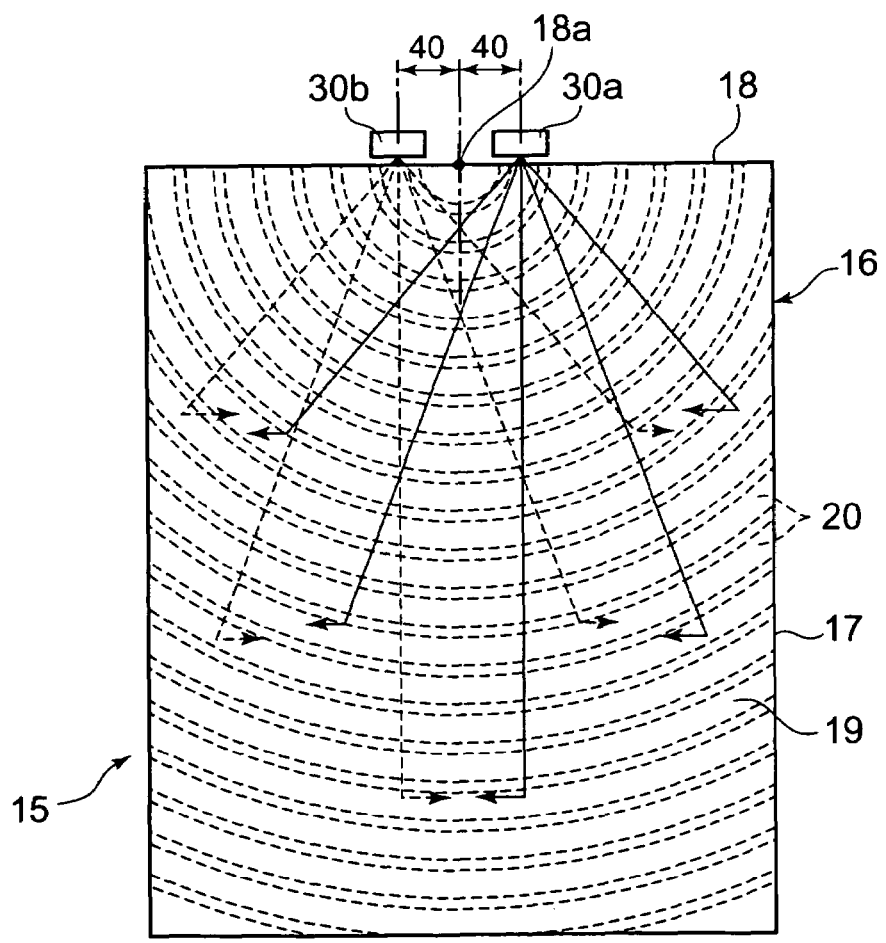
FIG. 3 is a front elevation of an illuminator used in the display apparatus shown in FIG. 1, as seen from in front of its light exit side.
Figure 4:
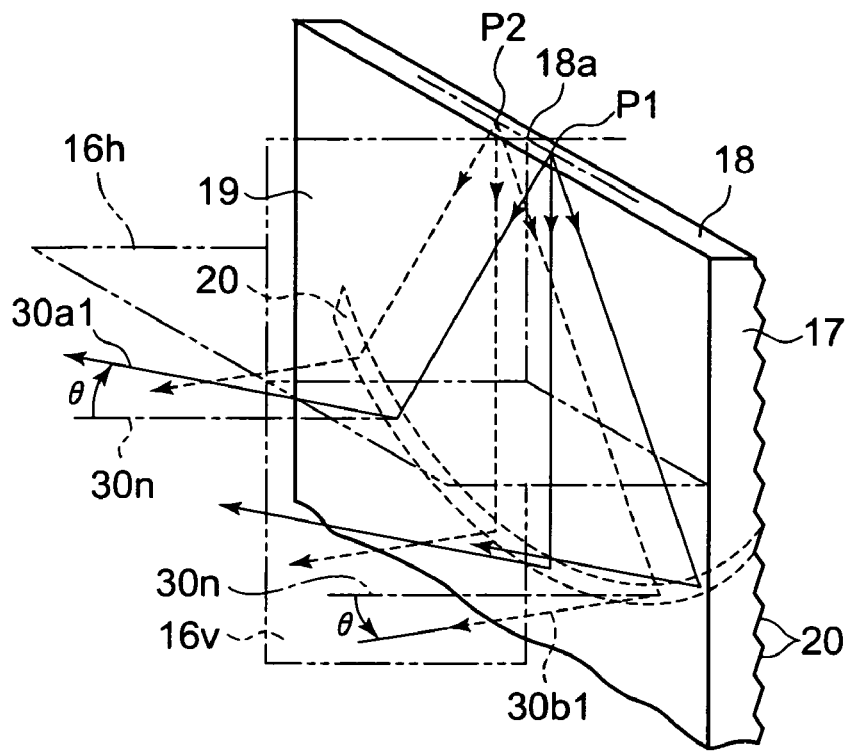
FIG. 4 is a perspective view showing how a light entering into a light guide plate travels, in the illuminator shown in FIG. 3.
Figure 5:
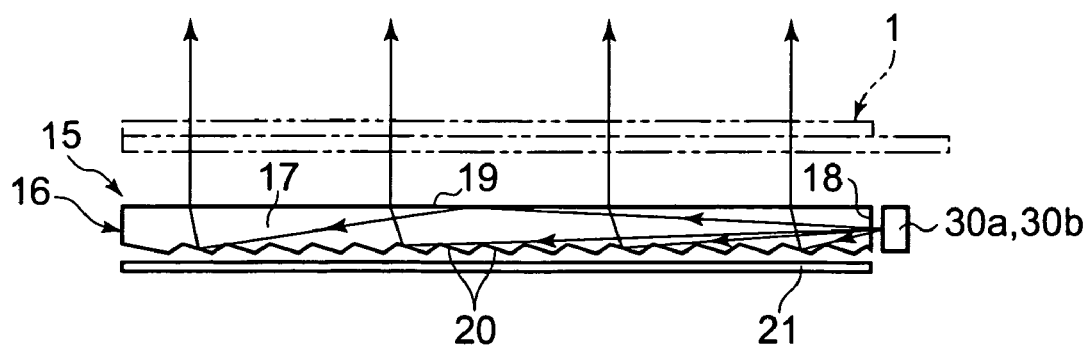
FIG. 5 is a cross-sectional view of the illuminator shown in FIG. 3.
Figure 6:
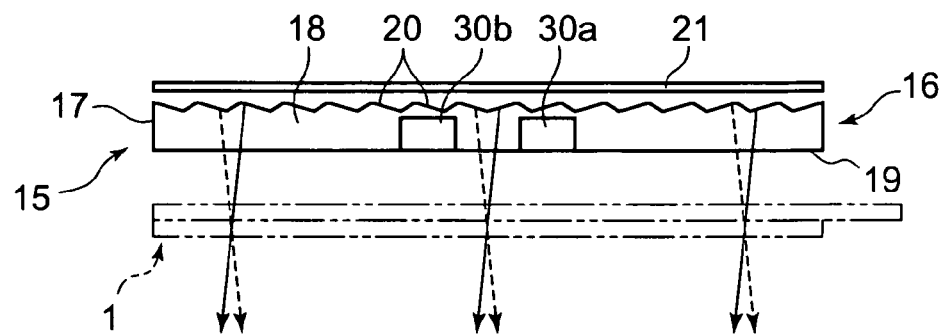
FIG. 6 is a plan view of the illuminator shown in FIG. 3, as seen from in front of its light entrance surface on which light emitting elements are disposed.

The illuminator 15 disposed at a side opposite to the observation side of the liquid crystal display panel 1 will now be explained. FIG. 3 is a front elevation of the illuminator 15, seen from in front of its light exit. FIG. 4 is a perspective view showing how a light coming into a light guide plate travels in the illuminator 15 shown in FIG. 3. FIG. 5 is a cross-sectional view showing the cross-sectional structure of the illuminator 15, with no hatching. FIG. 6 is a plan view of the illuminator 15, seen from in front of its light entrance where light emitting elements are disposed.

The illuminator 15 comprises a light direction changing member 16, a first light emitting element 30*a*, and a second light emitting element 30*b*. The light direction changing member 16 has its light entrance end surface 18, from which a light enters, formed along either one of the upper and lower edges of the screen surface of the liquid crystal display panel 1, substantially in parallel with the left and right orientation of the liquid crystal display panel 1. The light direction changing member 16 has, on either its surface facing the liquid crystal display panel 1 or its opposite surface opposite thereto, a plurality of concentric circular-arcing slanted surfaces 20, which form circular arcs concentric with a semicircle having its center 18*a* at the mid point of the longer dimension of the light entrance end surface 18, for emitting the light coming from the light entrance end surface 18 toward the liquid crystal display panel 1 by changing the direction of the light. The first and second light emitting elements 30*a* and 30*b* are disposed near the center 18*a* of the light entrance end surface 18 of the light direction changing member 16, at positions P1 and P2 at substantially an equal distance 40 leftward and rightward from the center of curvature of the circular-arcing slanted surfaces 20, for emitting lights dispersing leftward and rightward toward the light entrance end surface 18.

The light direction changing member 16 of the illuminator 15 is constituted by a light guide plate 17 made of plate-like transparent material such as acrylic resin plate. Among the surrounding four end surfaces of the light guide plate 17, one end surface corresponding to one of the upper and lower edges of the screen surface of the liquid crystal display panel 1, for example, corresponding to the upper edge of the screen surface, serves as the light entrance end surface 18 from which a light enters. One of the plate surfaces of the transparent plate constructing the light guide plate 17, that faces the liquid crystal display panel 1, which is a planar surface substantially parallel with the substrates 2 and 3 of the liquid crystal display panel 1, serves as a light exit surface 19 from which a light is externally emitted. The circular-arcing slanted surfaces 20 are formed on the surface counter (opposite) to the light exit surface 19 of the light guide plate 17. The circular-arcing slanted surfaces 20 are formed in a plural number in shapes of circular arcs concentric with the semicircle having its center 18*a* at the mid point of the longer dimension of the light entrance end surface 18. The circular-arcing slanted surfaces 20 change the direction of the light coming into the transparent plate from the light entrance end surface 18, and emit the light from the light exit surface 19 toward the liquid crystal display panel 1.

Although exaggerated and shown large in the drawing, the circular-arcing slanted surfaces 20 of the light guide plate 17 are formed concentrically at a pitch almost equal to or smaller than the pixel pith of the liquid crystal display panel 1.

Each of the plurality of circular-arcing slanted surfaces 20 of the light guide plate 17 is a slanted surface oriented toward the center of the semicircle, and inclined at a predetermined angle in a direction opposite to the light exit surface 19.

As indicated by the arrows in FIG. 3 to FIG. 6, the light guide plate 17 changes the direction of a light coming from the light entrance end surface 18 by totally reflecting the light on the interface between the plurality of circular-arcing slanted surfaces 20 and the atmosphere (air), and emits the light from the light exit surface 19 toward the liquid crystal display panel 1 by reflecting the light on the interface between the light exit surface 19 and the atmosphere in a direction in which the light will be at a smaller angle with respect to the normal line of the light exit surface 19. The angle of inclination of the plurality of circular-arcing slanted surfaces 20 is set such that, when a light that will disperse leftward and rightward is entered from the center of curvature of the circular-arcing slanted surfaces 20, a light having such a directivity as will make the emission light intensity peak appear in a direction parallel with the normal line of the liquid crystal display panel 1, will be emitted from the light exit surface 19 of the light guide plate 17.

That is, on the light guide plate 17 constituting the light direction changing member 16, the circular-arcing slanted surfaces 20 are formed so as to arc along the semicircle centered at the center 18*a* which is substantially the mid point of the length of an edge of the light entrance end surface 18 intersecting with the light exit surface 19, and so as to internally reflect a light entering from the center 18*a* of the light entrance end surface 18 such that the light will be emitted in the direction of the normal line of the light exit surface 19 of the light guide plate 17. Assuming that a plane perpendicular to both the light exit surface 19 and the light entrance end surface 18 is a vertical reference plane 16v and a plane including the normal line of the light exit surface 19 and perpendicular to the vertical reference plane 16v is a horizontal reference plane 16h, the light direction changing member 16 emits lights entering from the positions of the first and second light emitting elements 30a and 30b by changing the advancing directions of the lights to directions inclined from the vertical reference plane 16v at respective angles corresponding to the distance from the center, of the positions from which the lights have entered, and parallel with respective planes perpendicular to the horizontal reference plane 16h as indicated by the two-dot chain lines in FIG. 4. The first light emitting element 30a and the second light emitting element 30b are disposed at positions which are apart from the center 18a of the light entrance end surface 18 by a predetermined distance toward both sides of the center 18a.

To be more specific, the light direction changing member 16 is provided, on the surface of the light guide plate 17 opposite to the light exit surface 19, with the plurality of circular-arcing slanted surfaces 20, which are formed plurally on concentric circles centered at the center 18a of the longer dimension of the light entrance end surface 18. The advancing direction of a first light, emitted from the first light emitting element 30a disposed on the light entrance end surface 18 to travel inside the light guide plate 17, is changed by the circular-arcing slanted surfaces 20, to a first direction inclined at a predetermined angle from the vertical reference plane 16v toward one side of the vertical reference plane 16v on the horizontal reference plane 16h, and the first light is emitted in this direction. A second light, emitted from the second light emitting element 30b disposed on the light entrance end surface 18 to travel inside the light guide plate 17, is emitted from the light exit surface 19, with its advancing direction changed to a second direction inclined at a predetermined angle from the vertical reference plane 16v toward the opposite side thereof on the horizontal reference plane 16h.

According to the present embodiment, a reflection plate 21 for reflecting a light that passes through the interface between the circular-arcing slanted surfaces 20 and the atmosphere to escape to the back of the light guide plate 17 (to the outside of the surface on which the circular-arcing slanted surfaces 20 are formed), among the lights coming into the light guide plate 17 from the light entrance end surface 18a, is disposed at the back of the light guide plate 17.

The structure of the first and second light emitting diodes 30a and 30b is not illustrated, but they each comprise an LED (Light Emitting Diode) molded with transparent resin, and have, at their light emission side, a lens for radiating the light emitted from the light emitting point of their LED by spreading (dispersing) the light over a plane parallel with the light exit surface 19 of the light guide plate 17.

The first and second light emitting elements 30a and 30b are disposed at the left and right sides of the center of curvature of the circular-arcing slanted surfaces 20a at the mid point of the light entrance end surface 18a of the light guide plate 17, so as to be apart from the center 18a by a substantially same distance 40, and such that the directions of dispersion of the lights emitted from the light emitting elements 30a and 30b are in line with the orientation of the longer dimension of the light entrance end surface 18 of the light guide plate 17, i.e., in line with the left and right orientation of the screen surface of the liquid crystal display panel 1.

The illuminator 15 lets out a light, emitted from the light emitting element 30a, of the first and second light emitting elements 30a and 30b, that is on the right side as seen from the observation side of the liquid crystal display panel 1, as a left eye illumination light having a directivity which will make the emission light intensity peak appear in a direction inclined from the normal line of the liquid crystal display panel 1 toward the left eye of the viewer, by changing the direction of the light by the plurality of circular-arcing slanted surfaces 20 of the light guide plate 17 as indicated by the arrows in FIG. 3 to FIG. 6. The illuminator 15 lets out a light, emitted from the light emitting element 30b on the left side as seen from the observation side, as a right eye illumination light having a directivity which will make the emission light intensity peak appear in a direction inclined from the normal line of the liquid crystal display panel 1 toward the right eye of the viewer, by changing the direction of the light by the plurality of circular-arcing slanted surfaces 20 of the light guide plate 17 as indicated by the broken arrows in FIG. 3 to FIG. 6.

That is, the first and second light emitting elements 30a and 30b are disposed near the center 18a of the light entrance end surface 18 of the light guide plate 17 to have substantially the same distance 40 from the center of curvature of the circular-arcing slanted surfaces 20 leftward and rightward respectively. As a result, a light, emitted from the light emitting element 30a, of the first and second light emitting elements 30a and 30b, that is on the right side as seen from the observation side of the liquid crystal display panel 1, is reflected by the plurality of circular-arcing slanted surfaces 20 in a direction 30a1, which is inclined by an angle θ toward the left side as seen from the observation side from a direction 30n in which a light from the center 18a of curvature of the circular-arcing slanted surfaces 20a is reflected. A light, emitted from the light emitting element 30b on the left side as seen from the observation side, is reflected by the plurality of circular-arcing slanted surfaces 20 in a direction 30b1 which is inclined toward the right side as seen from the observation side from the direction 30n in which the light from the center 18a of curvature of the circular-arcing slanted surfaces 20 is reflected.

As described above, the angle of inclination of the plurality of circular-arcing slanted surfaces 20 of the light guide plate 17 is set such that, when a light dispersing leftward and rightward from the center of curvature of the circular-arcing slanted surfaces 20 is entered into the light guide plate 17, a light having a directivity which will make the emission light intensity peak appear in a direction parallel with the normal line of the liquid crystal display panel 1 will be emitted from the light exit surface 19 of the light guide plate 17. Accordingly, when the light emitting element 30a on the right side as seen from the observation side is lit, i.e., when a light dispersing leftward and rightward from the point deviated to the right side from the center of curvature of the circular-arcing slanted surfaces 20 is entered into the light guide plate 17, a left eye illumination light having a directivity which will make the emission light intensity peak appear in a direction inclined from the normal line of the liquid crystal display panel 1 toward the left side as seen from the observation side of the liquid crystal display panel, i.e., inclined toward the direction of the left eye of the viewer, will be emitted from the light exit surface 19 of the light guide plate 17. When the solid-state light emitting element 30b on the left side as seen from the observation side is lit, i.e., when a light dispersing leftward and rightward from the point deviated to the left side from the center of curvature of the circular-arcing slanted surfaces 20 is entered into the light guide plate 17, a right eye illumination light having a directivity which will make the emission light intensity peak appear in a direction inclined to the right side as seen from the observation side of the liquid crystal display panel 1, i.e., inclined to the right eye of the viewer, will be emitted.

Figure 7:
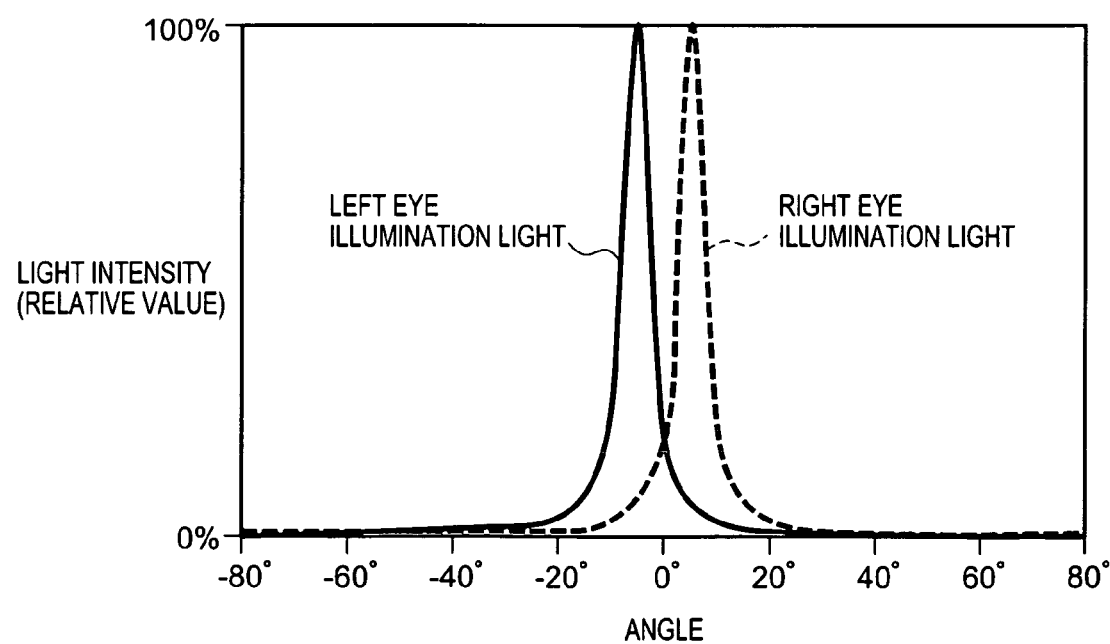
FIG. 7 is a distribution graph of the light intensity of light emitted from the illuminator according to the first embodiment.

FIG. 7 shows the distribution of the light intensity of the left eye illumination light and right eye illumination light emitted from the illuminator 15. In FIG. 7, the negative angles indicate the angles in the left side as seen from observation side of the illuminator 15 with respect to the normal line (vertical reference plane 16$v$) of the illuminator 15. The positive angles indicate the angles in the right side as seen from the observation side with respect to the normal line of the illuminator 15. As shown in FIG. 7, emission lights having strong directivities which will make the light intensity peaks appear in the range of angles of 7° to 8° in both the left and right sides of the normal line of the illuminator 15 is achieved.

The control device 32 shown in FIG. 1 comprises a display drive circuit 32$a$ for controlling the gate driver 13 and the data driver 14, a light source drive circuit 32$b$ for controlling the lighting of the first and second light emitting elements 30$a$ and 30$b$ of the illuminator 15, and a control circuit 32$c$ for controlling the operations of the display drive circuit 32$a$ and light source drive circuit 32$b$. The display drive circuit 32$a$ drives the liquid crystal display panel 1 so as to sequentially display two different images on the display panel 1. In case of three-dimensional display, the display drive circuit 32$a$ controls to alternately display two images, i.e., a right eye image and a left eye image, having a parallax corresponding to images to be viewed by the left and right eyes of the viewer. The light source drive circuit 32$b$ alternately turns on the first and second light emitting elements 30$a$ and 30$b$, in synchronization with the display of the two images.

The display apparatus according to the first embodiment displays a three-dimensional color image by field sequential display, so the first and second light emitting elements 30$a$ and 30$b$ each include a red LED for emitting a red light, a green LED for emitting a green light, and a blue LED for emitting a blue right, to selectively emit lights of three colors of red, green, and blue.

The control device 32 selects, in an arbitrary order, left eye image data and right eye image data prepared for the respective three unit colors of red, green, and blue, for respective six fields obtained by hexasecting one frame for displaying one three-dimensional color image, and sequentially supplies the selected image data to the pixels of the liquid crystal display panel 1. In synchronization with the display of a left eye image for each of the respective unit colors of red, green, and blue, the control device 32 drives one LED for the color of the image being displayed, among the LEDs for the three colors of red, green, and blue of the light emitting element 30$a$ on the right side so that a left eye illumination light having that color will be emitted from the illuminator 15. In synchronization with the display of a right eye image for each of the respective unit colors of red, green, and blue, the control device 32 turns on one LED for the color of the displayed image, among the LEDs for the three colors of red, green, and blue of the light emitting element 30$b$ on the left side so that a right eye illumination light having that color will be emitted from the illuminator 15.

That is, according to the present display apparatus, the control device 32 selectively supplies a signal for left eye image data for each of the respective unit colors of red, green, and blue, to the plurality of pixels of the liquid crystal display panel 1 in order to display a left eye image having each of the respective unit colors, and controls the illuminator 15 to emit a left eye illumination light having each of the respective unit colors of red, green, and blue in synchronization with the display of the image for each color. The control device 32 supplies a signal for right eye image data for each of the respective unit colors to the pixels in order to display a right eye image for each of the respective unit colors, while controlling the illuminator 15 to emit a right eye illumination light having each of the respective unit colors of red, green, and blue in synchronization with the display of the image having each color. Therefore, left eye images for the respective unit colors of red, green, and blue corresponding to the left eye image data and right eye images for the respective unit colors of red, green, and blue corresponding to the right eye image data are sequentially displayed on the liquid crystal display panel 1, so that the viewer will view a three-dimensional image.

Since the present display apparatus sequentially performs displaying of left eye images using all the pixels on the liquid crystal display panel 1 and displaying of right eye images using all the pixels on the liquid crystal display panel 1, a three-dimensional image having a high image quality in which both the left eye images and the right eye images have a high resolution, can be displayed.

Further, since the present liquid crystal display apparatus has, behind itself, the illuminator, which emits lights having directivities in directions toward both the left and right eyes, it can display a three-dimensional image having a favorable luminance balance between the left eye images and the right eye images, in spite of its simple structure.

As described above, in the illuminator 15, the light direction changing member 16 is provided with the circular-arcing slanted surfaces 20, which form arcs along the semicircle having its center 18$a$ at substantially the mid point of the length of an edge of the light entrance end surface 18 intersecting with the light exit surface 19, for internally reflecting a light entering from the center 18$a$ of the light entrance end surface 18 so as to be emitted in the direction of the normal line of the light exit surface 19 of the light guide plate 17. Further, the first and second light emitting elements 30$a$ and 30$b$ are disposed at positions on both sides of the center 18$a$ of the light entrance end surface 18 of the light guide plate 17 apart from the center 18$a$ by a predetermined distance. Consequently, lights emitted from the respective light emitting elements can be emitted separately as a light whose advancing direction is changed to have a transmission light intensity peak in the left hand side with respect to the normal line of the illuminator 15, and as a light whose advancing direction is changed to have a transmission light intensity peak in the right hand side with respect to the normal line of the illuminator 15.

Furthermore, the present illuminator 15 has the circular-arcing slanted surfaces 20 and the first and second light emitting elements 30$a$ and 30$b$. The circular-arcing slanted surfaces 20 are formed on one of the opposite surface and light exit surface 19 of the light guide plate 17 and form arcs along the semicircle having its center 18$a$ at substantially the mid point of the length of an edge of the light entrance end surface 18 intersecting with the light exit surface 19. Further, when assuming that a plane perpendicular to both the light exit surface 19 and the light entrance end surface 18 is a vertical reference plane 16$v$ and a plane including the normal line of the light exit surface 19 and perpendicular to the vertical reference plane 16$v$ is a horizontal reference plane 16$h$, the circular-arcing slanted surfaces 20 emit, from the light exit surface 19, lights entering from two positions on both sides of the center 18$a$ of the light entrance end surface 18 apart from the center 18$a$ by a predetermined distance, by changing the advancing directions of the respective lights, to the directions which are inclined with respect to the vertical reference plane 16v at respective angles corresponding to the distance from the center, of the positions from which the lights have entered, and parallel with respective planes perpendicular to the horizontal reference plane 16h. The first and second light emitting elements 30a and 30b are disposed at positions which are equidistantly apart from the center 18a of the longer dimension of the light entrance end surface 18 of the light guide plate 17, at which center 18a the center of curvature of the arcs of the circular-arcing slanted surfaces 20 is defined, for entering illumination lights into the light guide plate 17 from the light entrance end surface 18. Accordingly, the illuminator 15 of the present invention can emit illumination lights having strong directivities toward the left and right sides as seen from the observation side of the light exit surface 19.

When the present illuminator 15 is used as an illuminator for three-dimensional display, a bright three-dimensional image can be displayed by using the illumination lights to be respectively emitted in the left and right directions, as a left eye illumination light and a right eye illumination light to be recognized by the left and right eyes respectively.

By adjusting the positions of the two light sources disposed on the light entrance end surface 18 of the light guide plate 17 in order to make the lights to be emitted toward the left and right directions have a larger angle, it is possible to make the image viewable from the left hand side and the image viewable from the right hand side clearly different from each other. Therefore, completely different images can be displayed toward the right hand side and the left hand side.

Second Embodiment

Figure 8:
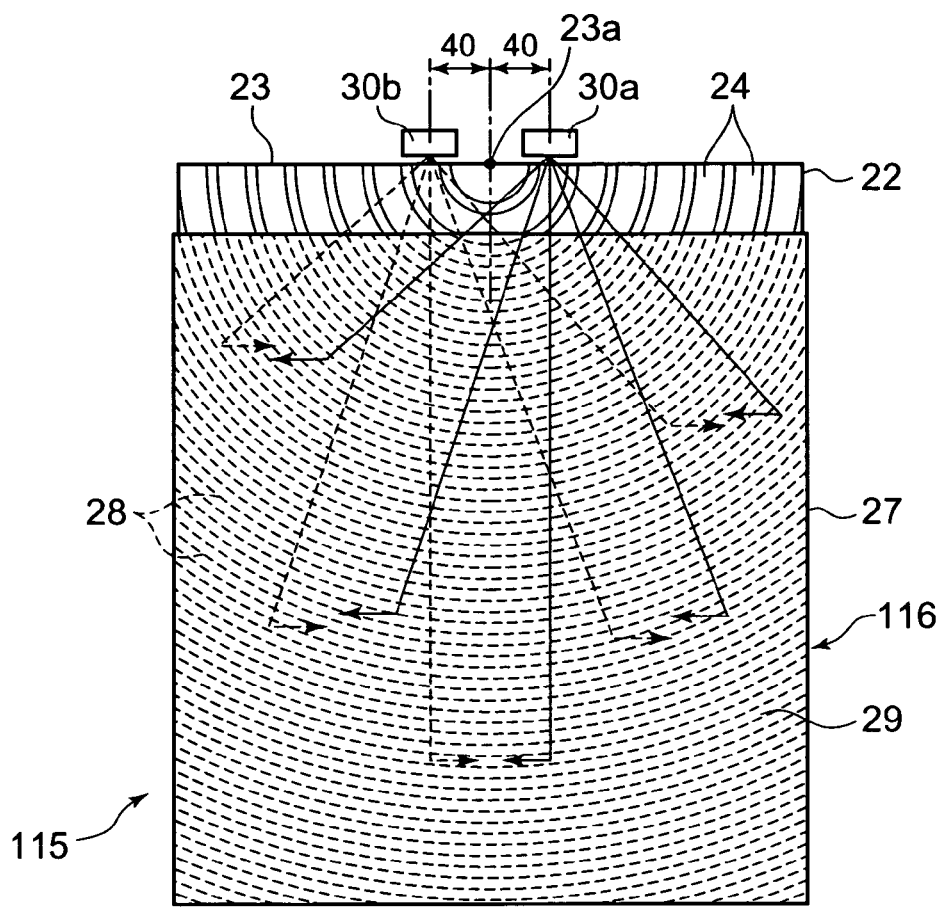
FIG. 8 is a front elevation of an illuminator showing the second embodiment of the present invention, as seen from in front of its light exit surface.
Figure 9:
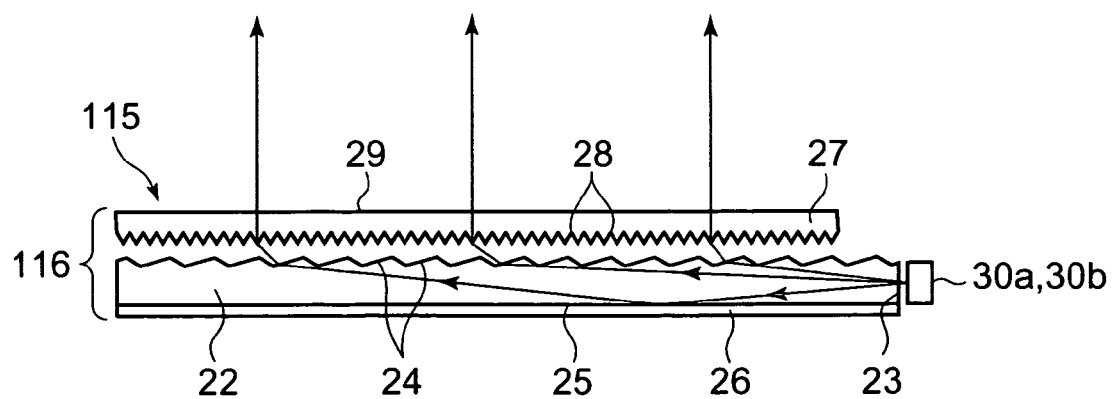
FIG. 9 is a cross-sectional view of the illuminator shown in FIG. 8.

FIG. 8 and FIG. 9 show the second embodiment of the present invention. FIG. 8 is a front elevation of an illuminator, disposed so as to face a surface of the liquid crystal display panel 1 opposite to the observation side, as seen from in front of the illuminator's light exit surface. FIG. 9 is a cross sectional view of the illuminator.

The light direction changing member 16 of the second embodiment is different from that of the first embodiment, but the other components are the same. Therefore, the same components will be denoted by the same reference numerals, and explanation for such components will be omitted.

An illuminator 115 according to the present embodiment comprises a light guide plate 22, a prism sheet 27 disposed at the light exit side of the light guide plate 22, and first and second light emitting elements 30a and 30b. The light guide plate 22 is made of plate-like transparent material such as acrylic resin plate. Among the surrounding four end surfaces of the light guide plate 22, one end surface corresponding to one of the upper and lower edges of the screen surface of the liquid crystal display panel 1 serves as a light entrance end surface 23 from which a light enters. The light guide plate 22 has, on one plate surface of the transparent plate, that faces the liquid crystal display panel 1, a plurality of concentric circular-arcing slanted surfaces 24, which form circular arcs concentric with a semicircle having its center 23a at the mid point of the longer dimension of the light entrance end surface 23, for letting out a light coming from the light entrance end surface 23 into the transparent plate, by changing the direction of the light. The plate surface of the light guide plate 22, opposite to the plate surface on which the circular-arcing slanted surfaces 24 are formed, serves as a reflection surface 25 for reflecting a light entering from the light entrance end surface 23 into the transparent plate, toward the circular-arcing slanted surfaces 24. The prism sheet 27 has, on its surface facing the light guide plate 22, a plurality of concentric circular-arcing prisms 28, which form circular arcs concentric with a semicircle having its center at a position corresponding to the center 23a of curvature of the circular-arcing slanted surfaces 24 of the light guide plate 22, for refracting a light emitted from the light guide plate 22 toward a direction in which the light will be at a smaller angle with respect to the normal line of the liquid crystal display panel 1. The surface of the prism sheet 27 facing the liquid crystal display panel 1, which is a planar surface substantially parallel with the substrates 2 and 3 of the liquid crystal display panel 1, serves as a light exit surface 29 from which a light refracted by the plurality of circular-arcing prisms 28 is emitted toward the liquid crystal display panel 1. The light guide plate 22 having the circular-arcing slanted surfaces 24, and the prism sheet 27 constitute a light direction changing member 116. The first and second light emitting elements 30a and 30b are disposed near the center 23a of the light entrance end surface 23 of the light guide plate 22 of the light direction changing member 116, so as to face each other at positions at substantially an equal distance 40 leftward and rightward from the center 23a of curvature of the circular-arcing slanted surfaces 24, for emitting lights dispersedly leftward and rightward, toward the light entrance end surface 23 of the light guide plate 22.

Each of the plurality of circular-arcing slanted surfaces 24 of the light guide plate 22 of the light direction changing member 116 is a refraction surface oriented toward the center 23a of the semicircle, and inclined at a predetermined angle in a direction opposite to the reflection surface 25. Each of the plurality of circular-arcing prisms 28 of the prism sheet 27 has a cross-sectional shape of an isosceles triangle.

That is, the circular-arcing slanted surfaces 24 form circular-arcing refraction surfaces, which form arcs concentric with the semicircle having its center at substantially the mid point of the length of an edge of the light entrance end surface 23 intersecting with the surface on which the circular-arcing slanted surfaces 24 is formed, for refracting a light entering from the center 23a of the light entrance end surface 23 so that the light will be emitted in a direction parallel with the horizontal reference plane 16h.

The plurality of circular-arcing slanted surfaces 24 emit, from the light exit surface 29, a first light emitted from the first light emitting element 30a disposed on the light entrance end surface 23 to travel inside the light guide plate 22, by changing the advancing direction of the first light to a first direction which is inclined, at a predetermined angle, from the vertical reference plane 16v toward one side, and parallel with a plane perpendicular to the horizontal reference plane 16h. Further, the circular-arcing slanted surfaces 24 refract a second light, emitted from the second light emitting element 30b disposed on the light entrance end surface 23 to travel inside the light guide plate 22, so that the second light will be emitted from the light exit surface 29 with its advancing direction changed to a second direction which is inclined, at a predetermined angle, from the vertical reference plane 16v toward a side opposite to the one side, and parallel with a plane perpendicular to the horizontal reference plane 16h.

The prism sheet 27 comprises the plurality of circular-arcing prisms 28, which are shaped into semicircular arcs plurally concentrically disposed about a point corresponding to the center 23a of curvature of the circular-arcing slanted surfaces 24 of the light guide plate 22, for refracting a light emitted from the light guide plate 22 in a direction parallel with the horizontal reference plane 16h.

According to the present embodiment, the reflection plate 25 of the light guide plate 22 is formed by providing a reflection film 26 on the plate surface of the light guide plate 22. The reflection plate 25 of the light guide plate 22 may be a total reflection surface constituted by the interface between the plate surface of the light guide plate 22 and the atmosphere.

The present illuminator 115 emits a light, entering into the light guide plate 22 of the light direction changing member 116 from the light entrance end surface 23, from the light guide plate 22, by changing the direction of the light by the plurality of circular-arcing slanted surfaces 24 as indicated by the arrows in FIG. 9, and refracts the light by the plurality of circular-arcing prisms 28 on the prism sheet 27 so as to be emitted toward the liquid crystal display panel 1. The angle of inclination of the plurality of circular-arcing slanted surfaces 24 of the light guide plate 22 and the angle of inclination of the two inclined surfaces of each of the plurality of circular-arcing prisms 28 of the prism sheet 27 are set such that, when a light dispersing leftward and rightward from the center 23a of curvature of the circular-arcing slanted surfaces 24 is entered into the light guide plate 22, a light having a directivity which will make the emission light intensity peak appear in a direction parallel with the normal line of the liquid crystal display panel 1 will be emitted from the light exit surface 29 of the prism sheet 27.

Hence, according to the illuminator 115, when the first light emitting element 30a disposed on the right side as seen from the observation side, of the first and second light emitting elements 30a and 30b, is turned on, i.e., when a light, dispersing leftward and rightward from a point deviated to the right side from the center 23a of curvature of the circular-arcing slanted surfaces 24, is entered into the light guide plate 22, a left eye illumination light having a directivity which will make the emission light intensity peak appear in a direction inclined to the left, as seen from the observation side of the liquid crystal display panel 1, from the normal line of the liquid crystal display panel 1, i.e., inclined toward the left eye of the viewer, will be emitted from the light exit surface 29 of the prism sheet 27, as indicated by arrows in FIG. 8. When the second light emitting element 30b disposed on the left side as seen from the observation side is turned on, i.e., hen a light, dispersing leftward and rightward from a point deviated to the left side from the center 23a of curvature of the circular-arcing slanted surfaces 24 is entered into the light guide plate 22, a right eye illumination light having a directivity which will make the emission light intensity peak appear in a direction inclined to the right, as seen from the observation side of the liquid crystal display panel 1, from the normal line of the liquid crystal display panel 1, i.e., inclined toward the right eye of the viewer, will be emitted from the light exit surface 29 of the prism sheet 27, as indicated by broken arrows in FIG. 8.

Thus, the illuminator 115 according to the present embodiment can emit a left eye illumination light by turning on the light emitting element 30a on the right side as seen from the observation side of the liquid crystal display panel 1, of the first and second light emitting elements 30a and 30b, and can emit a right eye illumination light by turning on the light emitting element 30b on the left side as seen from the observation side.

Third Embodiment

Figure 10:
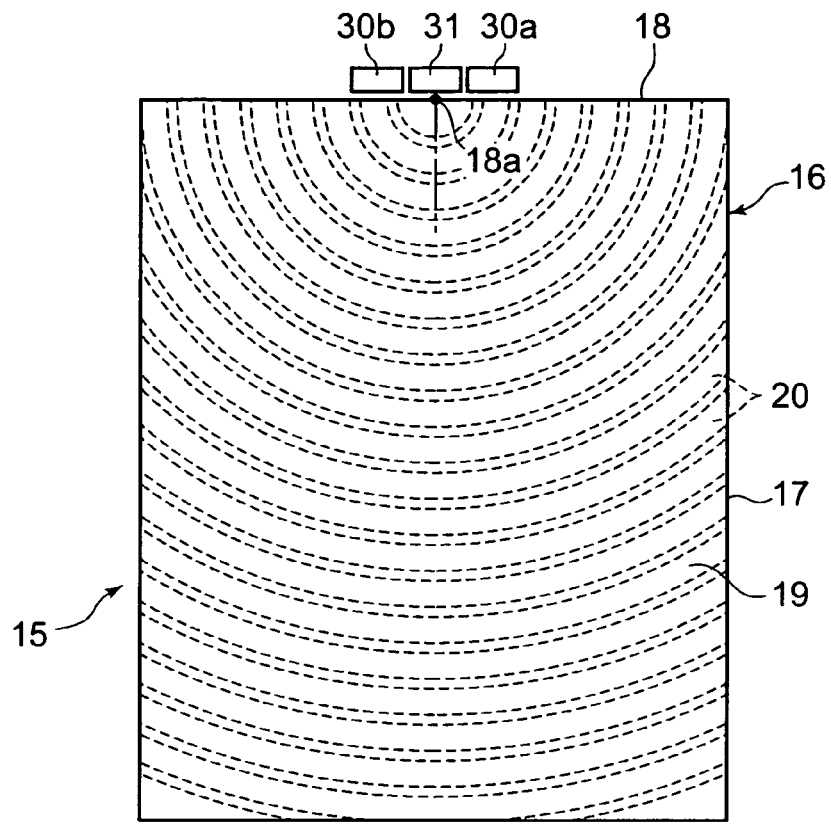
FIG. 10 is a front elevation of an illuminator showing the third embodiment of the present invention, as seen from in front of its light exit surface.
Figure 11:
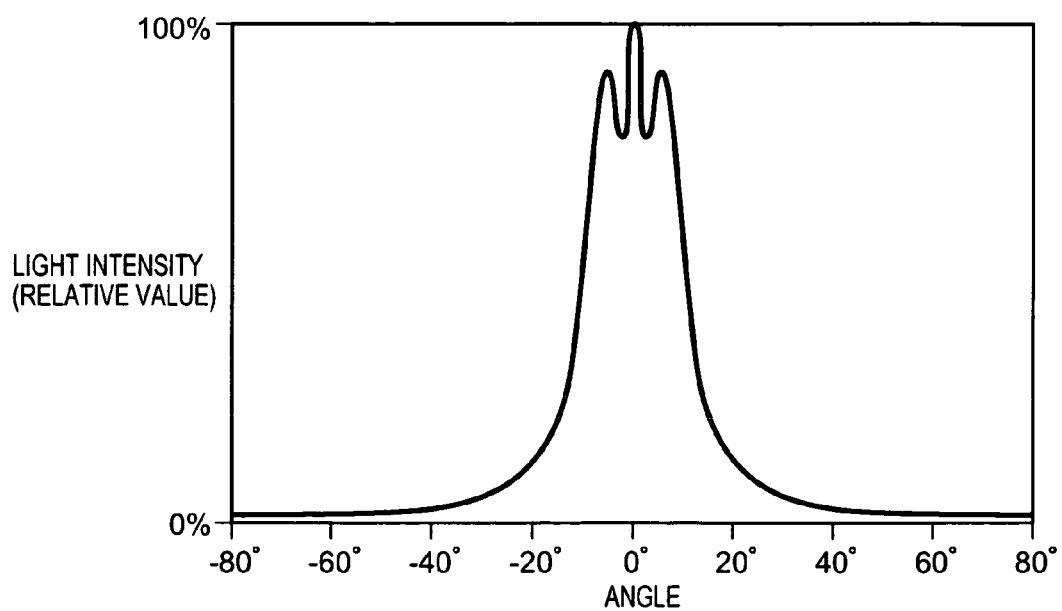
FIG. 11 is a distribution graph of the light intensity of light emitted from the illuminator according to the third embodiment shown in FIG. 10.

FIG. 10 and FIG. 11 show the third embodiment of the present invention. FIG. 10 is a front elevation of an illuminator, disposed so as to face a surface of the liquid crystal display panel 1 opposite to the observation side, as seen from in front of the illuminator's light exit surface. FIG. 11 is a distribution graph of the light intensity of light emitted from the illuminator according to the third embodiment. According to the third embodiment, a third light emitting element is additionally included in the structure of first embodiment, and the other components are the same as those of the first embodiment. Thus, the same components will be denoted by the same reference numerals, and explanation for such components will be omitted.

According to the present embodiment, the illuminator 15 according to the first embodiment further comprises a third light emitting element 31, which is disposed between the first and second light emitting element 30a and 30b so as to face the center of curvature of the circular-arcing slanted surfaces 20 of the light direction changing member 16, for emitting a light dispersing leftward and rightward toward the light entrance end surface 18 of the light direction changing member 16. Further, the control device 32 comprises a display drive circuit 32a for selectively displaying a two-dimensional image and a three-dimensional image on the plurality of pixels of the liquid crystal display panel 1, and a light source drive circuit 32b including a lighting control circuit 32b1 for selectively performing alternate lighting of the first and second light emitting elements 30a and 30b, and simultaneous lighting of the first and second light emitting elements 30a and 30b and the third light emitting element 31, in synchronization with the display of the two-dimensional image and the three-dimensional image.

The illuminator according to the present embodiment is equipped with the third light emitting element 31, at a position corresponding to the center 18a of the light entrance end surface 18 of the light guide plate 17 on which the center of curvature of the circular-arcing slanted surfaces 20 is defined, for making a light enter into the light guide plate 17 from the center 18a of the light entrance end surface 18. Further, the light guide plate 17 comprises the plurality of circular-arcing slanted surfaces 20 which cause a light, entering from the center 18a of the light entrance end surface 18, to be emitted from the light exit surface 19, with its advancing direction changed to a direction parallel with the vertical reference plane 16v. Accordingly, by the simultaneous lighting of the first and second light emitting elements 30a and 30b and the third light emitting element 31, illumination lights having directivities which will make the emission light intensity peaks appear in directions inclined to the left and the right, as seen from the observation side, from the normal line of the illuminator 15, are combined with a light having a directivity which will make the emission light intensity peak appear in a direction parallel with the normal line of the illuminator 15, thereby producing illumination light having a distribution of intensity as shown in FIG. 11, making it possible to sufficiently raise the luminance in the front-forward direction (normal line direction) of the illuminator 15.

Hence, the display apparatus according to the present embodiment displays left eye image data and right eye image data selectively on the plurality of pixels of the liquid crystal display panel 1, and displays a steric three-dimensional image by lighting the first light emitting element 30a on the right side, as seen from the observation side of the liquid crystal display panel 1, of the first and second light emitting elements 30a and 30b of the illuminator 15, in synchronization with the display of the left eye image, and by lighting the second light emitting element 30b on the left side, as seen from the observation side of the liquid crystal display panel 1, in synchronization with the display of the right eye image. When the display apparatus displays a two-dimensional image on the plurality of pixels of the liquid crystal display panel 1, it can display the two-dimensional image brightly, by simultaneously lighting the first and second light emitting elements 30a and 30b and the third light emitting element 31 disposed between the two, in synchronization with the display of the two-dimensional image.

The present embodiment is achieved by adding the third light emitting element 31 to the illuminator 15 of the first embodiment shown in FIG. 1 to FIG. 7. However, the third light emitting element 31 may be added to the illuminator 115 of the second embodiment shown in FIG. 8 and FIG. 9.

Furthermore, according to the first and second embodiments, the liquid crystal display panel 1, which does not comprise a color filter, is employed, to display a color image by field sequential display. However, the present invention can be applied to a liquid crystal display apparatus, which displays a color image with the use of a liquid crystal display panel comprising color filters having multiple colors corresponding to the plurality of pixels, for example, color filters having three colors of red, green, and blue.

Fourth Embodiment

Figure 12:
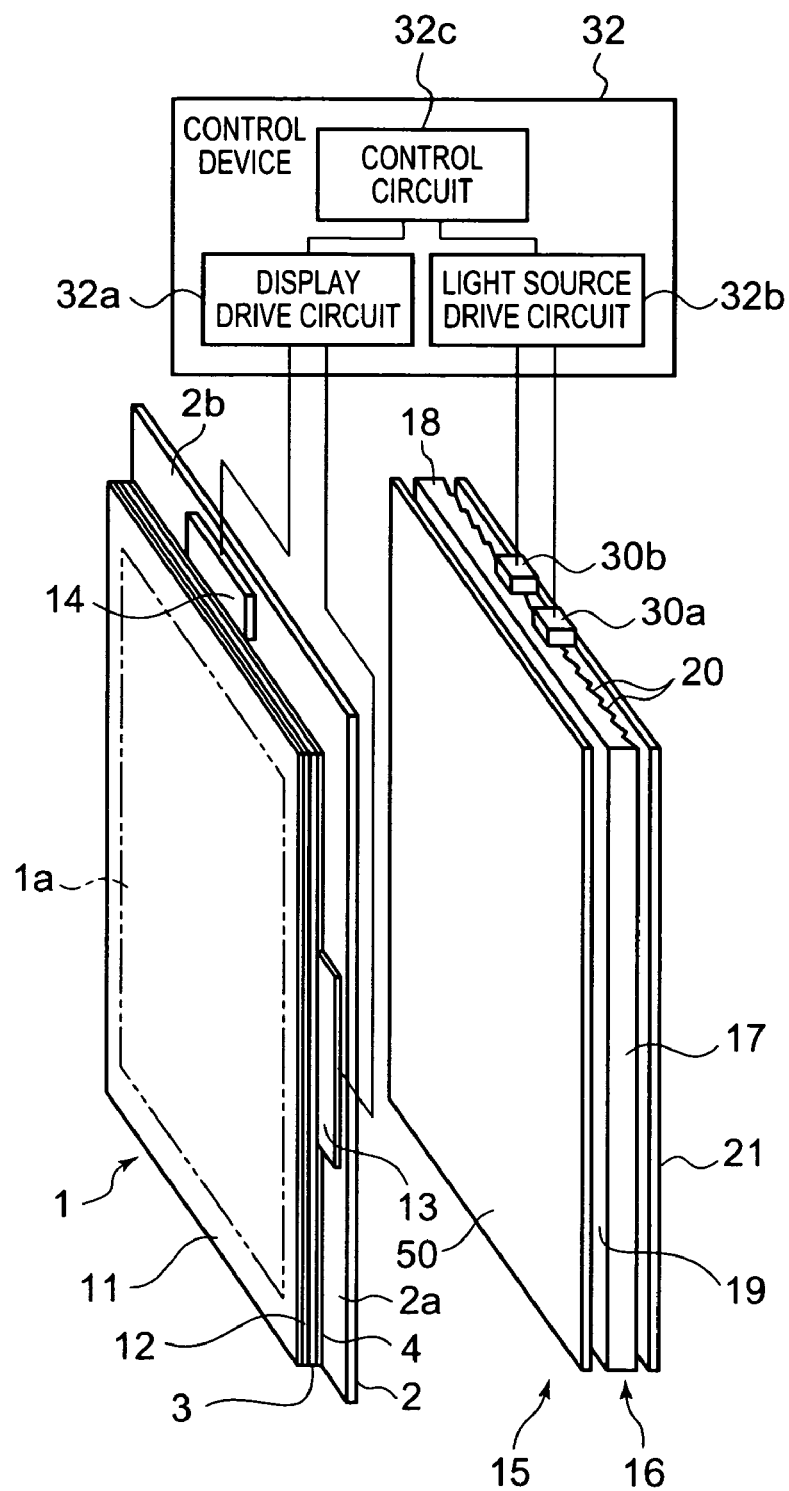
FIG. 12 is an exploded perspective view of a display apparatus showing the fourth embodiment of the present invention.
Figure 13:
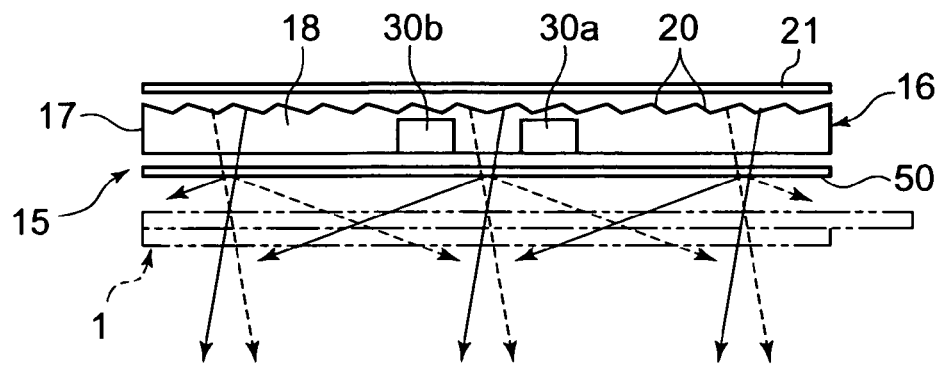
FIG. 13 is a plan view of an illuminator shown in FIG. 12, as seen from in front of its light entrance surface on which light emitting elements are disposed.
Figure 14:
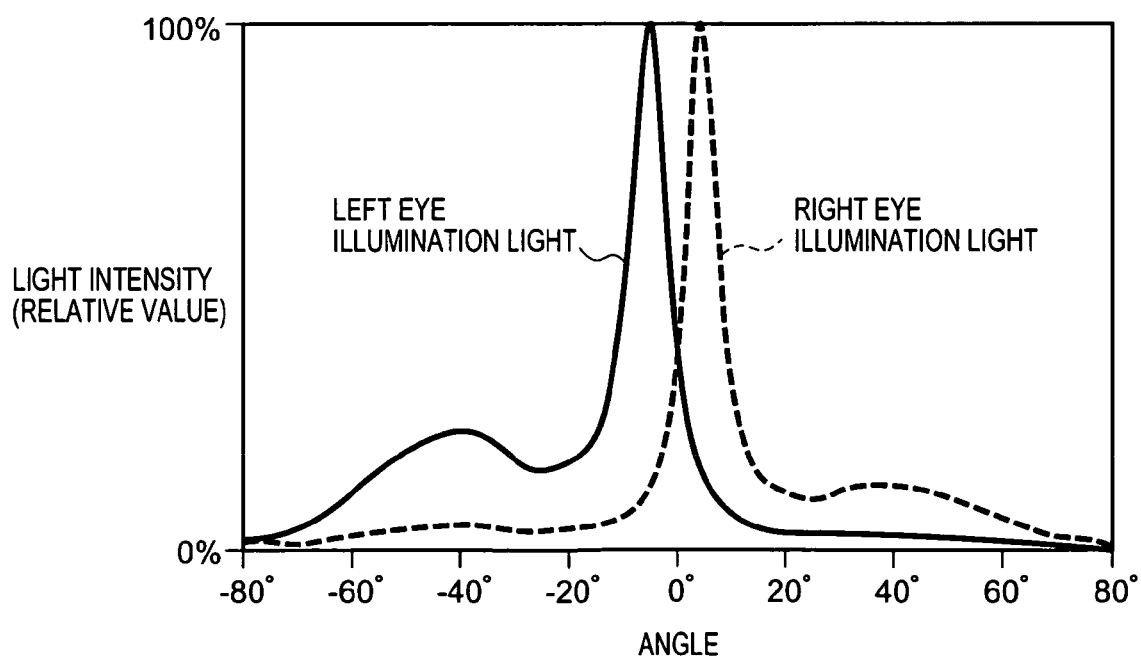
FIG. 14 is a distribution graph of the light intensity of light emitted from the illuminator of the fourth embodiment shown in FIG. 13.

FIG. 12 to FIG. 14 show the fourth embodiment of the present invention. FIG. 12 is an exploded perspective view of a display apparatus. FIG. 13 is a plan view of an illuminator according to the present embodiment, as seen from in front of its light entrance surface on which light emitting elements are disposed. FIG. 14 is a distribution graph of the light intensity of light emitted from the illuminator according to the present embodiment.

The fourth embodiment comprises, in addition to the components of the first embodiment, an anisotropic dispersion plate 50 having a function for dispersing a light in a specific range of angles, in order to broaden the viewable range. The other components are the same. Thus, the same components will be denoted by the same reference numerals, and explanation for such components will be omitted.

According to the fourth embodiment, the anisotropic dispersion plate 50 for allowing a light, entering thereinto at an angle of incidence within a predetermined range of angles with respect to the normal line of the plate surface thereof, to be dispersedly pass therethrough, is disposed between the liquid crystal display panel 1 and illuminator 15 of the display apparatus shown in FIG. 1 to FIG. 7. The anisotropic dispersion plate 50 is disposed so as to face the light exit surface 19 of the light guide plate 17 of the display apparatus. With a plane perpendicular to both the light exit surface 19 and the light entrance end surface 18 regarded as a vertical reference plane 16v and a plane including the normal line of the light exit surface 19 and perpendicular to the vertical reference plane 16v regarded as a horizontal reference plane 16h, the anisotropic dispersion plate 50 dispersedly emits each light, which enters thereinto at its own angle of incidence within a predetermined range of angles with respect to the vertical reference plane 16v on the horizontal reference plane 16h.

The anisotropic dispersion plate 50 according to the present embodiment has a dispersion characteristic of dispersing a light, which enters thereinto from a direction inclined, with respect to the vertical reference plane 16v parallel with the up and down orientation of the display apparatus, at an angle of 10° to 60° to both the left and the right on the horizontal reference plane 16h. Accordingly, among the lights from the first and second light emitting elements 30a and 30b emitted from the light exit surface 19 of the light guide plate 17, lights emitted at angles within the range of 10° to 60° with respect to the normal line of the anisotropic dispersion plate 50 to both the left side and right side of the normal line, are dispersed by the anisotropic dispersion plate 50 to be entered into the liquid crystal display panel 1, as shown in FIG. 13.

As a result, the present illuminator 15 can achieve illumination light having a distribution of intensity in which a strong peak appears at angles of 7° to 8° with respect to the normal line of the light exit surface 19 of the illuminator 15 in both the left side and the right side, and intensities strong enough to make the displayed images viewable are achieved in the range of angles of 15° to 80°, as shown in FIG. 14.

Accordingly, by performing three-dimensional display in the same manner as the first embodiment by using the present illuminator 15, it is possible to make a three-dimensional steric image be viewed from in front of the display apparatus by making a right eye image and a left eye image be viewed by the respective eyes, while making the right eye image or the left eye image be viewed as a two-dimensional image from the right hand side position or the left hand side position which is greatly inclined to the right side or the left side from the front of the display apparatus, making it possible to greatly broaden the range of view.

According to the present embodiment, the anisotropic dispersion plate 50 is disposed between the illuminator 15 and liquid crystal display panel 1 of the display apparatus according to the first embodiment. However, the present invention is not limited to this, but the anisotropic dispersion plate 50 may be disposed between the illuminator 115 and liquid crystal display panel 1 of the display apparatus according to the second embodiment. Also in this case, functions and effects similar to those of the fourth embodiment can be achieved.

Further, the third embodiment may be applied to the fourth embodiment, to dispose the third light emitting element 31 correspondingly to the center 18a of the light entrance end surface 18 of the light guide plate 17. In this case, a two-dimensional image having a high luminance in the front-forward direction and having a broad range of view can be displayed.

Fifth Embodiment

Figure 15:
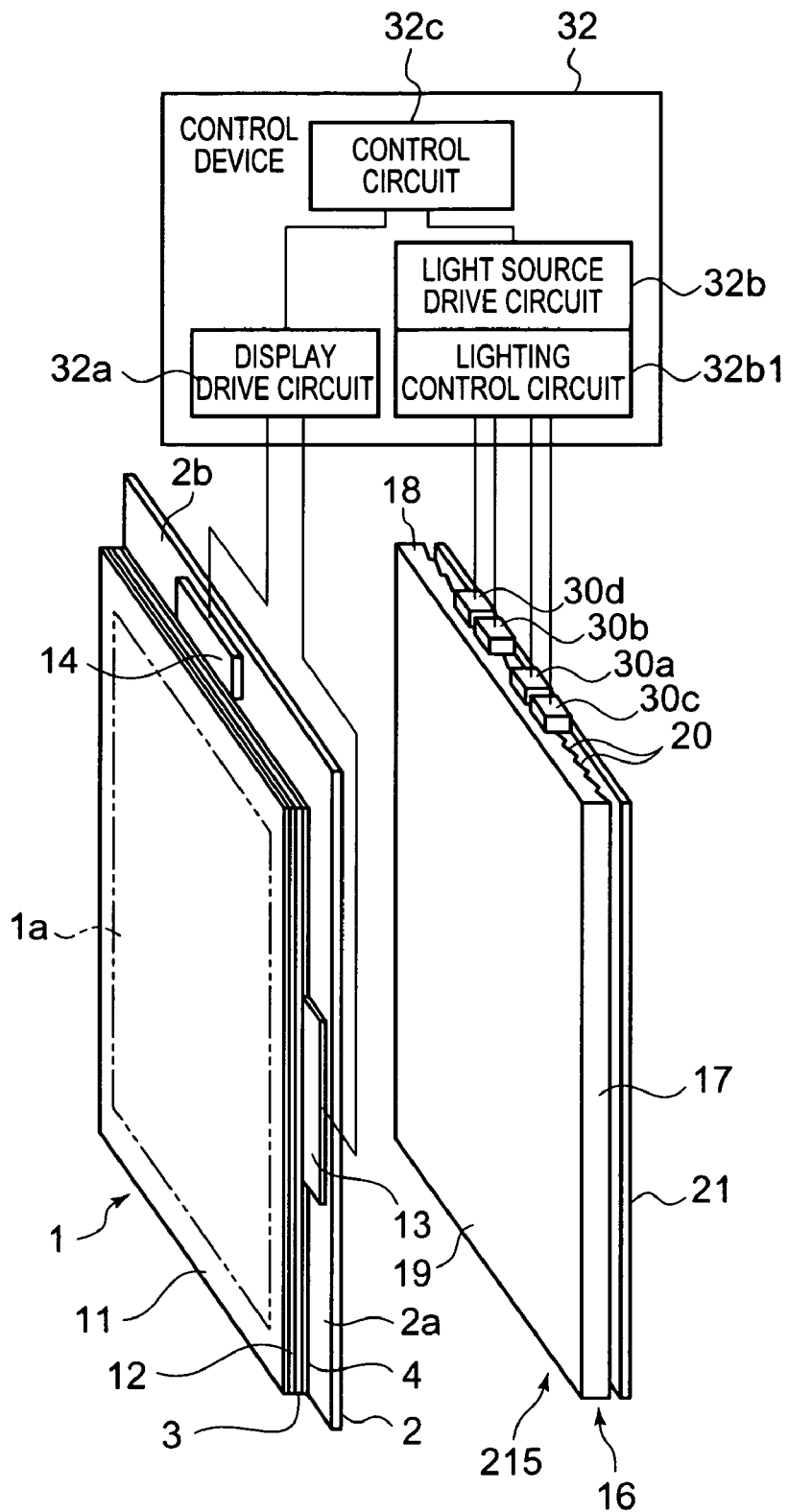
FIG. 15 is an exploded perspective view of a display apparatus showing the fifth embodiment of the present invention.
Figure 16:
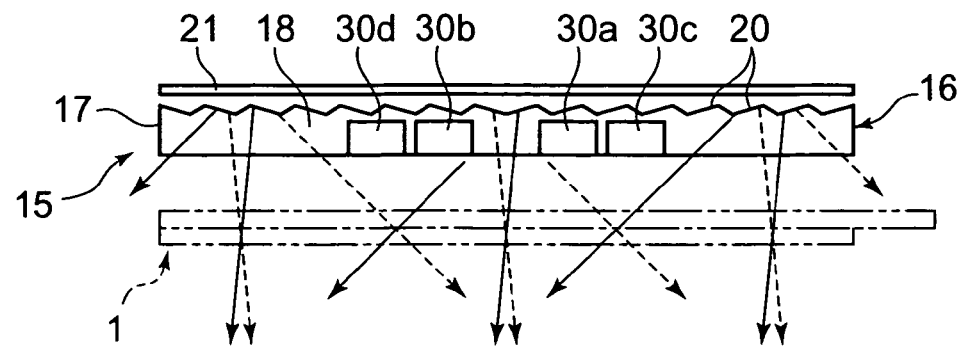
FIG. 16 is a plan view of an illuminator shown in FIG. 15, as seen from in front of its light entrance surface on which light emitting elements are disposed.
Figure 17:
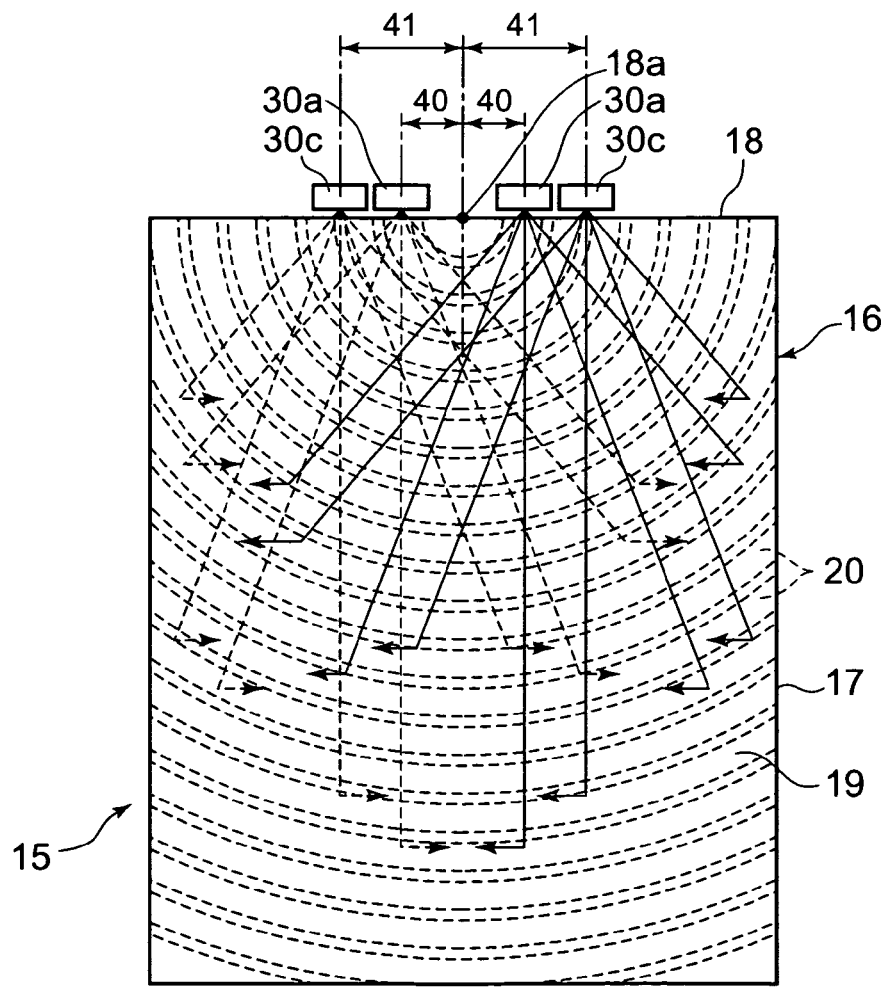
FIG. 17 is a front elevation of the illuminator used in the display apparatus shown in FIG. 15, as seen from in front of its light exit surface.
Figure 18:
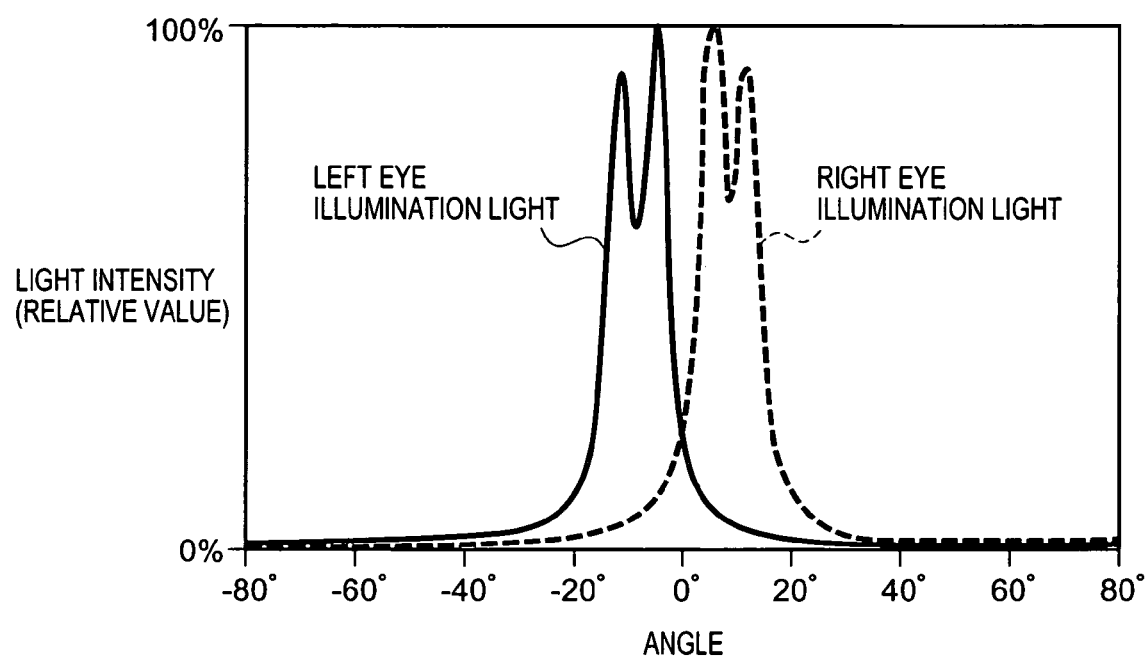
FIG. 18 is a distribution graph of the light intensity of light emitted from the illuminator of the fifth embodiment shown in FIG. 15.

FIG. 15 to FIG. 18 show the fifth embodiment of the present invention. FIG. 15 is an exploded perspective view of a display apparatus. FIG. 16 is a plan view of an illuminator according to the present embodiment, as seen from in front of its light entrance surface on which light emitting elements are disposed. FIG. 17 is a front elevation of the illuminator according to the present embodiment, as seen from in front of its light exit surface. FIG. 18 is a distribution graph of the light intensity of light emitted from the illuminator according to the present embodiment.

The fifth embodiment aims for broadening the range of view, by adding fourth and fifth light emitting elements 30c and 30d to the structure of the first embodiment. The other components are the same as those of the first embodiment. Thus, the same components will be denoted by the same reference numerals, and explanation for such components will be omitted.

The illuminator 215 according to the fifth embodiment is obtained by additionally forming, on the light entrance end surface 18 of the light guide plate of the illuminator 15 according to the first embodiment shown in FIG. 1 to FIG. 7, fourth and fifth light emitting elements 30c and 30d for entering illumination lightd into the light guide plate 17 from the light entrance end surface 18. The fourth and fifth light emitting elements 30c and 30d are disposed respectively on the external sides of the first and second light emitting elements 30a and 30b which are disposed on the light entrance end surface 18, so as to face each other at positions at substantially an equal distance 41 from the center 18a at which the center of curvature of the circular-arcing slanted surfaces 20 is defined. The light source drive circuit 32b comprises a circuit for controlling lighting of the first and second light emitting elements 30a and 30b and the fourth and fifth light emitting elements 30c and 30d, i.e., a lighting control circuit 32b1 for alternately performing simultaneous lighting of the first and fourth light emitting elements 30a and 30c on one side of the center 18a, and simultaneous lighting of the second and fifth light emitting elements 30b and 30d on the other side of the center 18a.

Lights, emitted from the fourth and fifth light emitting elements 30c and 30d on the external sides of the first and second light emitting elements 30a and 30b disposed on the light entrance end surface 18 of the light guide plate 17, to enter into the light guide plate 17, have their advancing directions changed by the circular-arcing slanted surfaces 20 to be emitted toward the liquid crystal display panel 1 as lights whose intensity peaks appear in directions which are more inclined from the normal line, than such directions of lights from the first and second light emitting elements 30a and 30b, as shown in FIG. 16 and FIG. 17, because the fourth and fifth light emitting elements 30c and 30d are farther than the first and second light emitting element 30a and 30b from the center 18a.

That is, assuming that a plane perpendicular to both the light exit surface 19 and the light entrance end surface 18 is a vertical reference plan 16v, and a plane including the normal line of the light exit surface 19 and perpendicular to the vertical reference plane 16v is a horizontal reference plane 16h, the lights emitted from the fourth and fifth light emitting elements 30c and 30d are emitted from the illuminator 215 as changed by the circular-arcing slanted surfaces 20 into lights, whose intensity peaks appear in directions inclined, on the horizontal reference plane 16h, at an angle of 15° with respect to the vertical reference plane 16v.

The illuminator 215 according to the present embodiment can achieve illumination light having a distribution of light intensity as shown in FIG. 18, having peaks of lights from the first and second light emitting elements 30a and 30b emitted from the light exit surface 19 of the light guide plate 17, and peaks of lights from the fourth and fifth light emitting elements 30c and 30d emitted from the light exit surface 19 of the light guide plate.

Accordingly, by performing three-dimensional display in the same manner as the first embodiment by using the present illuminator 215, it is possible to make a three-dimensional steric image be viewed from in front of the display apparatus by making a right eye image and a left eye image be viewed by the respective eyes, while making the right eye image or the left eye image be viewed as a two-dimensional image from the right hand side position or the left hand side position which is inclined to the right side or the left side from the front of the display apparatus at an angle of 15° to 20°, making it possible to broaden the range of view.

In the present embodiment, an example has been shown, in which the fourth and fifth light emitting elements 30c and 30d are disposed on the illuminator 15 of the display apparatus shown the first embodiment. However, the present invention is not limited to this, but the fifth and fourth light emitting elements 30c and 30d may be disposed on the light guide plate 22 of the illuminator 115 of the display apparatus shown in the second embodiment. Also in this case, functions and effects similar to those of the present embodiment can be achieved.

The third embodiment may be applied to the present fifth embodiment to dispose the third light emitting element 31 correspondingly to the center 18a of the light entrance end surface 18 of the light guide plate 17. In this case, a two-dimensional image having a high luminance in the front-forward direction and having a broad range of view can be displayed.

Sixth Embodiment

Figure 19:
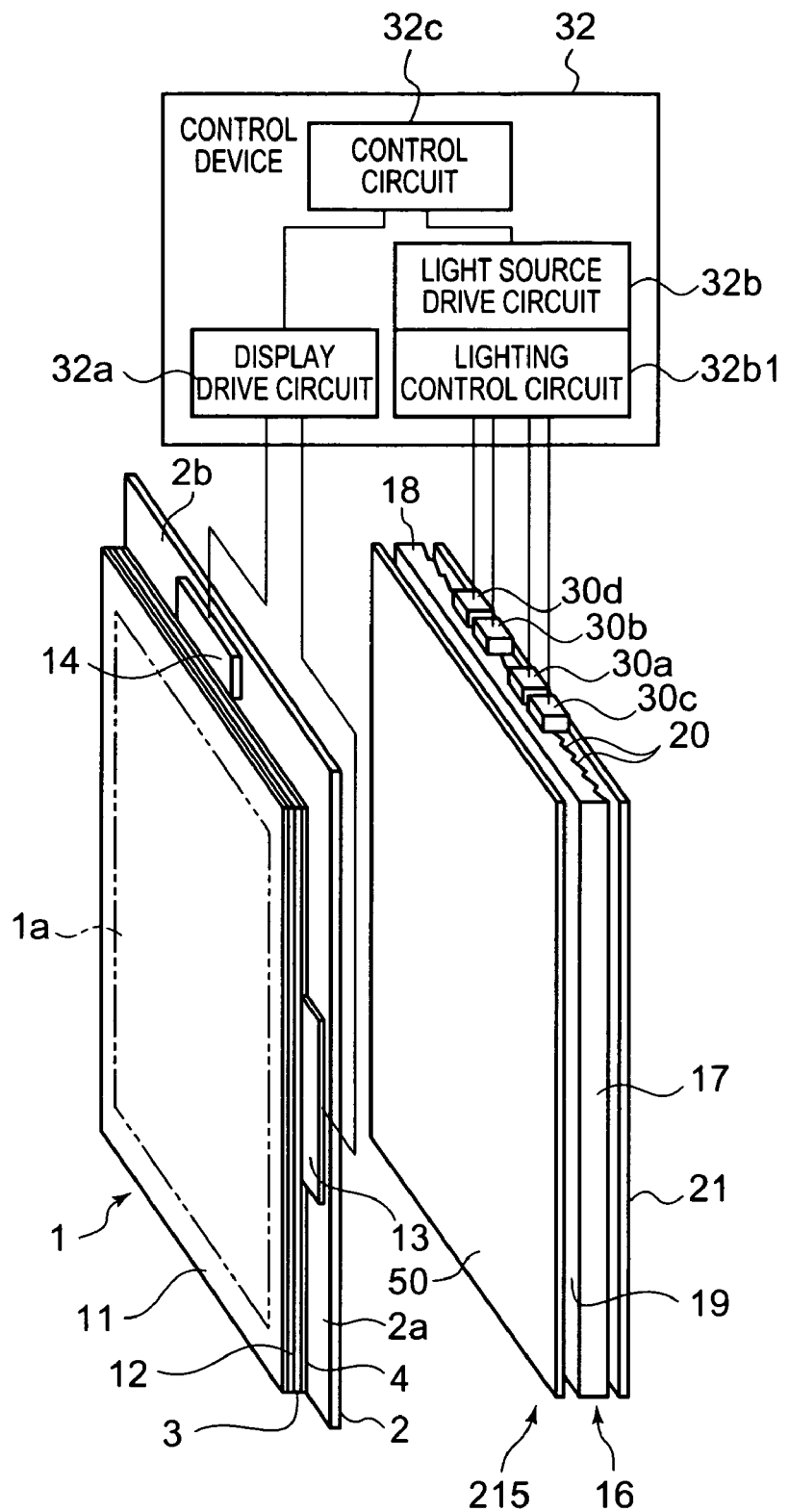
FIG. 19 is an exploded perspective view of a display apparatus showing the sixth embodiment of the present invention.
Figure 20:
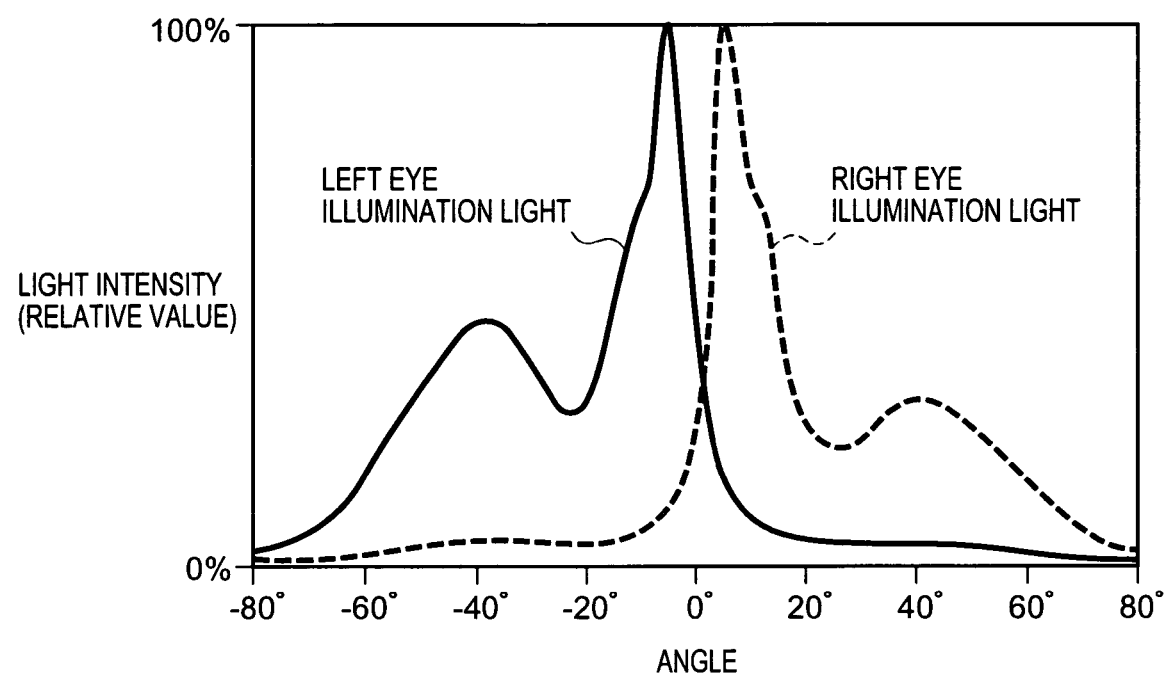
FIG. 20 is a distribution graph of the light intensity of light emitted from the illuminator of the sixth embodiment shown in FIG. 19.

FIG. 19 and FIG. 20 show the sixth embodiment of the present invention. FIG. 19 is an exploded perspective view of a display apparatus, and FIG. 20 is a distribution graph of the light intensity of light emitted from an irradiator according to the present embodiment.

The sixth embodiment is for further broadening the range of view, by adding the fourth and fifth light emitting elements 30c and 30d shown in the fifth embodiment to the structure of the fourth embodiment. The other components are the same as those of the fifth embodiment. Thus, the same components will be denoted by the same reference numerals, and explanation for such components will be omitted.

The illuminator 215 according to the sixth embodiment is obtained by providing the illuminator 15 of the display apparatus according to the fourth embodiment shown in FIG. 12 and FIG. 13, with the fourth and fifth light emitting elements 30c and 30d for entering illumination lights into the light guide plate 17 from the light entrance end surface 18. The fourth and fifth light emitting elements 30c and 30d are disposed respectively on the external sides of the first and second light emitting elements 30a and 30b which are disposed on the light entrance end surface 18 of the light guide plate of the illuminator 215, so as to face each other at positions at substantially an equal distance 41 from the center 18a at which the center of curvature of the circular-arcing slanted surfaces 20 is defined. The light source drive circuit 32b comprises a circuit for controlling lighting of the first and second light emitting elements 30a and 30b and the fourth and fifth light emitting elements 30c and 30d, i.e., a lighting control circuit 32b1 for alternately performing simultaneous lighting of the first and fourth light emitting elements 30a and 30c on one side of the center 18a, and simultaneous lighting of the second and fifth light emitting elements 30b and 30d on the other side of the center 18a.

Lights, emitted from the fourth and fifth light emitting elements 30c and 30 disposed on the light entrance end surface 18 of the light guide plate 17 more farther from the center 18a than the first and second light emitting elements 30a and 30b, to enter into the light guide plate 17, have their advancing directions changed by the circular-arcing slanted surfaces 20 to be emitted toward the liquid crystal display panel 1 as lights whose intensity peaks appear in directions which are more inclined from the normal line, than such directions of lights from the first and second light emitting elements 30a and 30b, because the fourth and fifth light emitting elements 30c and 30d are farther than the first and second light emitting element 30a and 30b from the center 18a.

That is, assuming that a plane perpendicular to both the light exit surface 19 and the light entrance end surface 18 is a vertical reference plan 16v, and a plane including the normal line of the light exit surface 19 and perpendicular to the vertical reference plane 16v is a horizontal reference plane 16h, the lights emitted from the fourth and fifth light emitting elements 30c and 30d are emitted from the illuminator 215 as changed by the circular-arcing slanted surfaces 20 into lights, whose intensity peaks appear in directions inclined, on the horizontal reference plane 16h, at an angle of about 15° with respect to the vertical reference plane 16v. The lights emitted from the illuminator 215 enter into the liquid crystal display panel 1, as dispersed by the anisotropic dispersion plate 50 having a dispersion characteristic of dispersing a light, which enters thereinto from a direction inclined at an angle of 10° to 60° leftward and rightward on the horizontal reference plane 16h.

The illuminator 215 according to the present embodiment can achieve illumination light having a distribution of light intensity as shown in FIG. 20, having peaks of lights from the first and second light emitting elements 30a and 30b emitted from the light exit surface 19 of the light guide plate 17, and having a relatively flat range of intensities in the range of 20° to 80°, as the lights emitted from the fourth and fifth light emitting elements 30c and 30d have been dispersed by the anisotropic dispersion plate 50.

Accordingly, by performing three-dimensional display in the same manner as the first embodiment by using the present illuminator 215, it is possible to make a three-dimensional steric image be viewed from in front of the display apparatus by making a right eye image and a left eye image be viewed by the respective eyes, while making the right eye image or the left eye image be viewed as a two-dimensional image from the right hand side position or the left hand side position which is inclined to the right side or the left side from the front of the display apparatus at an angle of 20° to 80°, making it possible to broaden the range of view.

In the present embodiment, an example has been shown, in which the anisotropic dispersion plate 50 is disposed between the illuminator 215 and liquid crystal display panel 1 of the display apparatus shown in the fifth embodiment. However, the present invention is not limited to this, but the anisotropic dispersion plate 50 may be disposed between the illuminator 115 and liquid crystal display panel 1 of the display apparatus shown in the second embodiment, and the fourth and fifth light emitting elements 30c and 30d may be provided on the light guide plate 17. Also in this case, functions and effects similar to those of the present embodiment can be achieved.

The third embodiment may be applied to the present sixth embodiment to dispose the third light emitting element 31 correspondingly to the center 18a of the light entrance end surface 18 of the light guide plate 17. In this case, a two-dimensional image having a high luminance in the front-forward direction and having a broad range of view can be displayed.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-101973 filed on Mar. 31, 2005 and including specification, claims, drawings and summary. The disclosure of the above Japanese Patent Application is incorporated herein by reference in its entirety.

What is claimed is:

1. A display apparatus, comprising
 (1) a display panel having a display area on which a plurality of pixels are arranged in a matrix, for displaying at least one image by the plurality of pixels when a display signal corresponding to image data for displaying an image is supplied to each of the plurality of pixels,
 (2) an illuminator disposed at a back of the display panel and comprising
  (I) a light guide plate having:
   a light entrance end surface, provided on one end surface of a plate-like transparent material, from which a light from a light source enters;
   a light exit surface, provided on a plate surface intersecting with the light entrance end surface, from which a light entering from the light entrance end surface goes out as guided in a predetermined direction;
   an opposite surface, provided on the other plate surface opposite to the light exit surface; and
   a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, and
  (ii) first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to face each other at the positions apart from the center by a substantially same distance, for entering illumination lights into the light guide plate from the light entrance end surface, and
 (3) a control device comprising a display drive circuit for sequentially displaying two different images on the display panel, and a light source drive circuit for alternately lighting the first and second light emitting elements in accordance with the two different images displayed on the display panel.

2. The display apparatus according to claim 1, wherein the circular-arcing slanted surfaces are constituted by a plurality of circular-arcing reflection surfaces formed on the opposite surface of the light guide plate, to have shapes of semicircular arcs formed plurally on concentric circles centered at the center of the longer dimension of the light entrance end surface, for reflecting a first light emitted from the first light emitting element disposed on the light entrance end surface to travel inside the light guide plate, so that the first light will be emitted from the light exit surface with its advancing direction changed to a first direction inclined at a predetermined angle with respect to the vertical reference plane toward one side of the vertical reference plane on the horizontal reference plane, and for reflecting a second light emitted from the second light emitting element disposed on the light entrance end surface to travel inside the light guide plate, so that the second light will be emitted from the light exit surface with its advancing direction changed to a second direction inclined at a predetermined angle with respect to the vertical reference plane toward the other side of the vertical reference plane on the horizontal reference plane.

3. The display apparatus according to claim 1, further comprising a prism sheet disposed outside the light exit surface of the light guide plate, and having a plurality of circular-arcing prisms formed to have shapes of semicircular arcs formed plurally on concentric circles centered at a point corresponding to the center of curvature of the circular-arcing slanted surfaces of the light guide plate, for refracting a light emitted from the light guide plate in a direction parallel with the horizontal reference plane, wherein the circular-arcing slanted surfaces are constituted by a plurality of circular-arcing refraction surfaces formed on the light exit surface of the light guide plate, to have shapes of semicircular arcs formed plurally on concentric circles centered at the center of the longer dimension of the light entrance end surface, for refracting a first light emitted from the first light emitting element disposed on the light entrance end surface to travel inside the light guide plate, so that the first light will be emitted from the light exit surface with its advancing direction changed to a first direction inclined at a predetermined angle with respect to the vertical reference plane toward one side of the vertical reference plane and parallel with a plane perpendicular to the horizontal reference plane, and for refracting a second light emitted from the second light emitting element disposed on the light entrance end surface to travel inside the light guide plate, so that the second light will be emitted from the light exit surface with its advancing direction changed to a second direction inclined at a predetermined angle with respect to the vertical reference plane toward the other side of the vertical reference plane and parallel with a plane perpendicular to the horizontal reference plane.

4. The display apparatus according to claim 1, further comprising a third light emitting element, disposed correspondingly to the center of the light entrance end surface of the light guide plate at which the center of curvature of arcs of the circular-arcing slanted surfaces is defined, for entering an illumination light into the light guide plate from the center of the light entrance end surface, wherein the light source drive circuit comprises a lighting control circuit for selecting alternate lighting of the first and second light emitting elements, and simultaneous lighting of the first, second, and third light emitting elements, and the light guide plate has a plurality of circular-arcing slanted surfaces for emitting a light entering from the center of the light entrance end surface from the light exit surface, by changing an advancing direction of the light to a direction parallel with the vertical reference plane.

5. The display apparatus according to claim 1, further comprising an anisotropic dispersion plate, disposed outside the light exit surface of the light guide plate so as to face the light exit surface, for dispersing a light emitted from the light exit surface, in directions inclined at predetermined angles within a predetermined range of angles, with respect to the vertical reference plane on the horizontal reference plane.

6. The display apparatus according to claim 1, further comprising an additional light emitting element and a further additional light emitting element, disposed on the light entrance end surface of the light guide plate, on external sides of the first and second light emitting elements respectively, so as to face each other at positions at substantially an equal distance from the center at which the center of curvature of the arcs of the circular-arcing slanted surfaces is defined, for entering illumination lights into the light guide plate from the light entrance end surface, wherein the light source drive circuit comprises a lighting control circuit for alternately performing simultaneous lighting of the first and the additional light emitting elements disposed on one side of the center, and simultaneous lighting of the second and the further additional light emitting elements disposed on the other side of the center.

7. A display apparatus, comprising
(1) a display panel having a display area on which a plurality of pixels are arranged in a matrix, for displaying at least one image by the plurality of pixels when a display signal corresponding to image data for displaying an image is supplied to each of the plurality of pixels,
(2) an illuminator comprising
(I) a light guide plate having:
a light entrance end surface, provided on one end surface of a plate-like transparent material, from which a light from a light source enters;
a light exit surface, provided on a plate surface intersecting with the light entrance end surface, from which a light entering from the light entrance end surface goes out as guided in a predetermined direction;
an opposite surface, provided on the other plate surface opposite to the light exit surface; and
a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, and
(ii) first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to face each other at the positions apart from the center by a substantially same distance, for entering illumination lights into the light guide plate from the light entrance end surface,
wherein the illuminator is disposed at a back of the display panel, such that the vertical reference plane is disposed in line with an up and down orientation of the display panel, the display apparatus further comprising (3) a display drive circuit for alternately displaying two images having a parallax corresponding to images recognized by left and right eyes of a viewer, on the display panel, and (4) a light source drive circuit for alternately lighting the first and second light emitting elements in accordance with display of the two images.

8. The display apparatus according to claim 7, wherein the circular-arcing slanted surfaces are constituted by a plurality of circular-arcing reflection surfaces formed on the opposite surface of the light guide plate, to have shapes of semicircular arcs formed plurally on concentric circles centered at the center of the longer dimension of the light entrance end surface, for reflecting a first light emitted from the first light emitting element disposed on the light entrance end surface to travel inside the light guide plate, so that the first light will be emitted toward the display panel as changed into a left eye illumination light having a directivity which will make an emission light intensity peak appear in a first direction inclined with respect to a normal line of the display panel toward one eye of the left and right eyes of the viewer, and for reflecting a second light emitted from the second light emitting element disposed on the light entrance end surface to travel inside the light guide plate, so that the second light will be emitted toward the display panel as changed into a right eye illumination light having a directivity which will make an emission light intensity peak appear in a second direction inclined toward the other eye.

9. The display apparatus according to claim 7, further comprising a prism sheet disposed outside the light exit surface of the light guide plate, for refracting a light emitted from the light guide plate in a direction parallel with the horizontal reference plane,
wherein the circular-arcing slanted surfaces are constituted by a plurality of circular-arcing refraction surfaces formed on the light exit surface of the light guide plate, to have shapes of semicircular arcs formed plurally on concentric circles centered at the center of the longer dimension of the light entrance end surface, for refracting, together with the prism sheet, a first light emitted from the first light emitting element disposed on the light entrance end surface of the light guide plate to travel inside the light guide plate, so that the first light will be emitted toward the display panel as changed into a left eye illumination light having a directivity which will make an emission light intensity peak appear in a first direction inclined with respect to a normal line of the display panel toward one eye of the left and right eyes of the viewer, and for refracting, together with the prism sheet, a second light emitted from the second light emitting element disposed on the light entrance end surface to travel inside the light guide plate, so that the second light will be emitted toward the display panel as changed into a right eye illumination light having a directivity which will make an emission light intensity peak appear in a second direction inclined toward the other eye.

10. The display apparatus according to claim 7, further comprising a third light emitting element, disposed correspondingly to the center of the light entrance end surface of the light guide plate at which the center of curvature of arcs of the circular-arcing slanted surfaces is defined, for entering an illumination light into the light guide plate from the center of the light entrance end surface,
wherein the light guide plate has a plurality of circular-arcing slanted surfaces for emitting a light entering from the center of the light entrance end surface from the light exit surface, by changing an advancing direction of the light so that the light will have an emission light intensity peak in a direction substantially parallel with a normal line of the light exit surface, and
the light source drive circuit comprises a lighting control circuit for selecting alternate lighting of the first and second light emitting elements, and simultaneous lighting of the first, second, and third light emitting elements.

11. The display apparatus according to claim 7, further comprising an additional light emitting element and a further additional light emitting element, disposed on the light entrance end surface of the light guide plate, on external sides of the first and second light emitting elements respectively, so as to face each other at positions at substantially an equal distance from the center at which the center of curvature of the arcs of the circular-arcing slanted surfaces is defined, for entering illumination lights into the light guide plate from the light entrance end surface,
wherein the light source drive circuit comprises a lighting control circuit for alternately performing simultaneous lighting of the first and the additional light emitting elements disposed on one side of the center, and simultaneous lighting of the second and the further additional light emitting elements disposed on the other side of the center.

12. A display apparatus, comprising:

(1) a display panel having a display area on which a plurality of pixels are arranged in a matrix, for displaying at least one image by the plurality of pixels when a display signal corresponding to image data for displaying an image is supplied to each of the plurality of pixels, (2) an illuminator disposed at a back of the display panel and comprising (I) a light guide plate having:

a light entrance end surface, provided on one end surface of a plate-like transparent material, from which a light from a light source enters;

a light exit surface, provided on a plate surface intersecting with the light entrance end surface, from which a light entering from the light entrance end surface goes out as guided in a predetermined direction;

an opposite surface, provided on the other plate surface opposite to the light exit surface; and a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, and (ii) first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to face each other at the positions apart from the center by a substantially same distance, for entering illumination lights into the light guide plate from the light entrance end surface, (iii) a third light emitting element, disposed correspondingly to the center of the light entrance end surface of the light guide plate at which the center of curvature of arcs of the circular-arcing slanted surfaces is defined, for entering an illumination light into the light guide plate from the center of the light entrance end surface, wherein the light source drive circuit comprises a lighting control circuit for selecting alternate lighting of the first and second light emitting elements, and simultaneous lighting of the first, second, and third light emitting elements, and the light guide plate has a plurality of circular-arcing slanted surfaces for emitting a light entering from the center of the light entrance end surface from the light exit surface, by changing an advancing direction of the light to a direction parallel with the vertical reference plane, and (3) a control device comprising a display drive circuit for sequentially displaying two different images on the display panel, and a light source drive circuit for controlling lighting of the first and second light emitting elements in accordance with the images displayed on the display panel.

13. A display apparatus, comprising:

(1) a display panel having a display area on which a plurality of pixels are arranged in a matrix, for displaying at least one image by the plurality of pixels when a display signal corresponding to image data for displaying an image is supplied to each of the plurality of pixels, (2) an illuminator disposed at a back of the display panel and comprising (I) a light guide plate having:

a light entrance end surface, provided on one end surface of a plate-like transparent material, from which a light from a light source enters;

a light exit surface, provided on a plate surface intersecting with the light entrance end surface, from which a light entering from the light entrance end surface goes out as guided in a predetermined direction;

an opposite surface, provided on the other plate surface opposite to the light exit surface; and a plurality of circular-arcing slanted surfaces, provided on either the opposite surface or the light exit surface, and forming circular-arcs concentric with a semicircle having its center at substantially a center of a length of an edge of the light entrance end surface intersecting with the light exit surface, for emitting, from the light exit surface, lights entering from at least two positions on the light entrance end surface, which positions are apart from the center of the light entrance end surface by a predetermined distance on both sides of the center, by changing advancing directions of the lights to directions inclined with respect to a vertical reference plane at respective angles corresponding to the distance from the center, of the positions from which the lights have entered, and parallel with respective planes perpendicular to a horizontal reference plane, where the vertical reference plane is a plane perpendicular to both the light exit surface and the light entrance end surface, and the horizontal reference plane is a plane including a normal line of the light exit surface and perpendicular to the vertical reference plane, (ii) first and second light emitting elements, disposed on the light entrance end surface of the light guide plate at positions on both sides of a center, which is a center of a longer dimension of the light entrance end surface at which a center of curvature of arcs of the circular-arcing slanted surfaces is defined, so as to face each other at the positions apart from the center by a substantially same distance, for entering illumination lights into the light guide plate from the light entrance end surface, (iii) an additional light emitting element and a further additional light emitting element, disposed on the light entrance end surface of the light guide plate, on external sides of the first and second light emitting elements respectively, so as to face each other at positions at substantially an equal distance from the center at which the center of curvature of the arcs of the circular-arcing slanted surfaces is defined, for entering illumination lights into the light guide plate from the light entrance end surface, wherein the light source drive circuit comprises a lighting control circuit for alternately performing simultaneous lighting of the first and the additional light emitting elements disposed on one side of the center, and simultaneous lighting of the second and the further additional light emitting elements disposed on the other side of the center, and (3) a control device comprising a display drive circuit for sequentially displaying two different images on the display panel, and a light source drive circuit for controlling lighting of the first and second light emitting elements in accordance with the images displayed on the display panel.

* * * * *